(12) United States Patent
Miwa

(10) Patent No.: US 10,939,005 B2
(45) Date of Patent: Mar. 2, 2021

(54) IMAGE READING DEVICE

(71) Applicant: BROTHER KOGYO KABUSHIKI KAISHA, Aichi-ken (JP)

(72) Inventor: Atsushi Miwa, Aichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/351,447

(22) Filed: Mar. 12, 2019

(65) Prior Publication Data

US 2019/0306352 A1    Oct. 3, 2019

(30) Foreign Application Priority Data

Mar. 30, 2018 (JP) ................. 2018-067037

(51) Int. Cl.
| | |
|---|---|
| *H04N 1/04* | (2006.01) |
| *H04N 1/00* | (2006.01) |
| *B65H 29/14* | (2006.01) |
| *B65H 29/50* | (2006.01) |
| *B65H 5/06* | (2006.01) |

(52) U.S. Cl.
CPC .......... *H04N 1/00557* (2013.01); *B65H 5/06* (2013.01); *B65H 29/14* (2013.01); *B65H 29/50* (2013.01); *H04N 1/00602* (2013.01); *H04N 1/00615* (2013.01); *B65H 2403/724* (2013.01)

(58) Field of Classification Search
CPC .......... H04N 1/00557; H04N 1/00615; H04N 1/00602; H04N 1/00525; H04N 1/00551; H04N 2201/0081; B65H 29/14; B65H 29/50; B65H 5/06; B65H 2403/724; B65H 2511/214; B65H 2404/1421; B65H 2404/6112; B65H 2511/152; B65H 2301/4212; B65H 2405/11151; B65H 31/02; B65H 2405/3321; B65H 2801/39; B65H 1/04; B65H 1/14; B65H 29/20; B65H 2801/03; B65H 2220/01; B65H 2220/02; B65H 2220/11; G03G 15/60; G03G 15/602

See application file for complete search history.

(56) References Cited

U.S. PATENT DOCUMENTS

| | | | | |
|---|---|---|---|---|
| 2005/0195450 | A1* | 9/2005 | Shoji | H04N 1/00822 358/497 |
| 2007/0104524 | A1* | 5/2007 | Suzuki | G03G 15/602 399/367 |
| 2009/0067909 | A1* | 3/2009 | Kim | B65H 29/125 399/405 |

FOREIGN PATENT DOCUMENTS

| | | |
|---|---|---|
| JP | 10-167545 A | 6/1998 |
| JP | 2005-8283 A | 1/2005 |

(Continued)

*Primary Examiner* — Huo Long Chen
(74) *Attorney, Agent, or Firm* — Kenealy Vaidya LLP

(57) ABSTRACT

An image reading device includes: a discharge guide including a discharge opening for discharging the sheet conveyed by the conveyance guide to the discharge tray, the discharge guide being configured to move from a third position to a fourth position according to the decrease in the number of the sheet to be supported by the supply tray, the fourth position being higher than the third position; a discharge roller configured to discharge the sheet through the discharge opening; and a first drive source which generates a first drive force for moving the discharge guide between the third position and the fourth position, wherein the first drive force is also used for rotating the discharge roller.

7 Claims, 16 Drawing Sheets

(56) References Cited

FOREIGN PATENT DOCUMENTS

| | | | | |
|---|---|---|---|---|
| JP | 2009044449 | A | * | 2/2009 |
| JP | 2010276788 | A | * | 12/2010 |
| JP | 2011084401 | A | * | 4/2011 |

* cited by examiner

IMAGE READING DEVICE

CROSS-REFERENCE TO RELATED APPLICATION

This application claims priorities from Japanese Patent Application No. 2018-067037 filed on Mar. 30, 2018, the entire subject matters of which is incorporated herein by reference.

TECHNICAL FIELD

The present disclosure relates to an image reading device.

BACKGROUND

JP-A-2005-008283 disclose a document feeding device which is an example of an image reading device according to the related art. The document feeding device is provided with a sheet feed tray, a sheet discharge tray, and a conveyance guide. The sheet feed tray supports a document to be supplied. The sheet discharge tray is positioned below the sheet feed tray and supports the document to be discharged. The conveyance guide conveys the document from the sheet feed tray to the sheet discharge tray. In the middle of the conveyance guide, an image reading position for reading an image on the document to be conveyed on the conveyance guide is set.

The sheet feed tray moves upward according to a decrease of sheets supported by the sheet feed tray and approaches a document pickup unit. The document feeding device further includes a swing conveyance unit and a discharge roller. The swing conveyance unit has a discharge opening for discharging the document conveyed by the conveyance guide to the sheet discharge tray. The swing conveyance unit moves upward according to a decrease of the document supported by the sheet feed tray, thereby separating the discharge opening from the sheet discharge tray. Specifically, a link member is installed between the sheet feed tray and the swing conveyance unit, and the discharge opening of the swing conveyance unit ascends and descends according to the ascent and descent of the sheet feed tray. The discharge roller discharges the sheet through the discharge opening. In JP-A-2005-008283, a configuration of a rotation drive of the discharge roller is not disclosed.

Meanwhile, an image reading device having the same configuration as that of the document feeding device described above is assumed to be adopted. The image reading device is provided with a supply tray including a movable body, a discharge guide, and a discharge roller. The discharge guide includes a discharge opening for discharging a sheet to a discharge tray. A link member is installed between a movable plate of the supply tray and the discharge guide. The discharge opening of the discharge guide ascends and descends according to the ascent and descent of the movable plate of the supply tray. The discharge roller discharges the sheet through the discharge opening.

However, since a configuration of a rotation drive of the discharge roller is not disclosed in JP-A-2005-008283, and the configuration of the rotation drive of the discharge roller is not apparent even in the image reading device, there is a possibility of increasing the number of components unless deviation is made regarding the rotation drive of the discharge roller. Specifically, there is a possibility of increasing the number of drive sources, drive components for rotating the discharge roller, and drive components for moving the discharge guide. As a result, there is a problem in that it is difficult to reduce the manufacturing cost.

SUMMARY

The present disclosure has been made in view of the above circumstances, and one of objects of the present disclosure is to provide an image reading device capable of achieving the reduction of the manufacturing cost.

According to an illustrative embodiment of the present disclosure, there is provided an image reading device including: a supply tray configured to supply a sheet to be supplied, the support tray including a movable plate that is configured to move from a first position to a second position according to a decrease of the sheet to be supported by the supply tray, the second position being higher than the first position; a discharge tray positioned below the supply tray, the discharge tray being configured to support the sheet to be discharged; a conveyance guide configured to convey the sheet from the supply tray to the discharge tray; a reading sensor configured to read an image on the sheet to be conveyed on the conveyance guide; a discharge guide including a discharge opening for discharging the sheet conveyed by the conveyance guide to the discharge tray, the discharge guide being configured to move from a third position to a fourth position according to the decrease in the number of the sheet to be supported by the supply tray, the fourth position being higher than the third position; a discharge roller configured to discharge the sheet through the discharge opening; and a first drive source configured to generate a first drive force. The first drive force generated by the first drive source moves the discharge guide between the third position and the fourth position, and also rotates the discharge roller.

DETAILED DESCRIPTION

Hereinafter, first and second embodiments according to the present disclosure will be described with reference to the drawings.

First Embodiment

Figure 1:
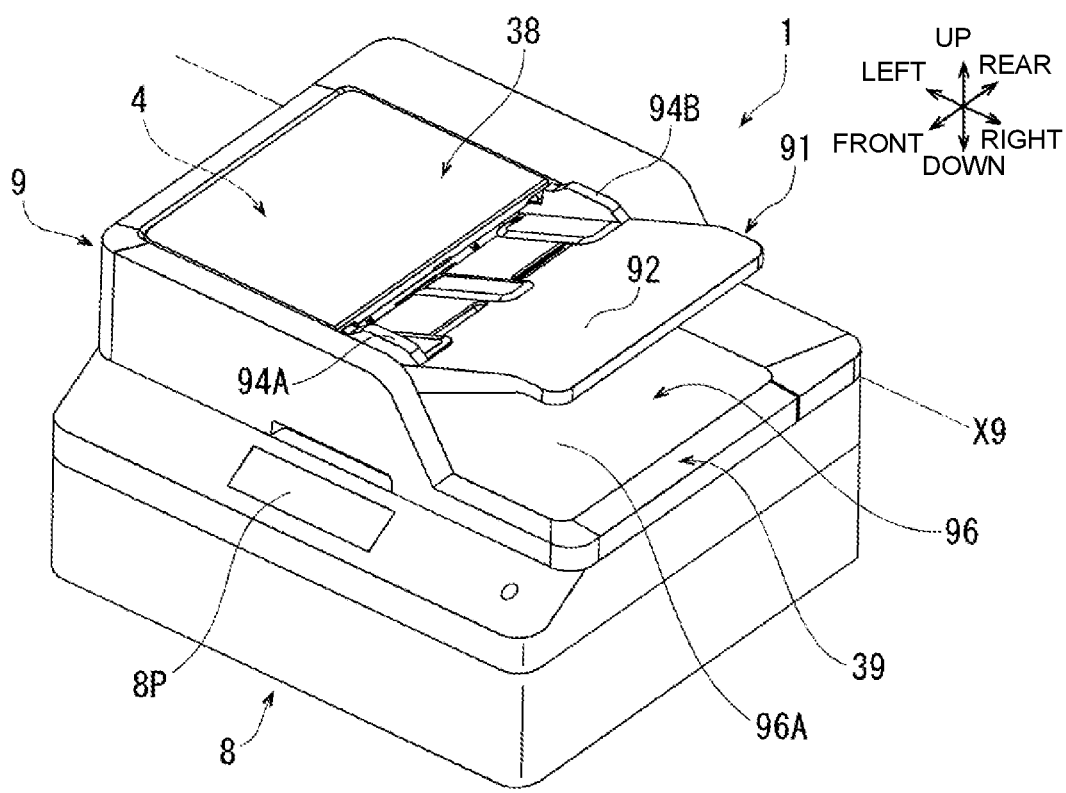
FIG. 1 is a perspective view illustrating an image reading device according to a first embodiment.
Figure 2:
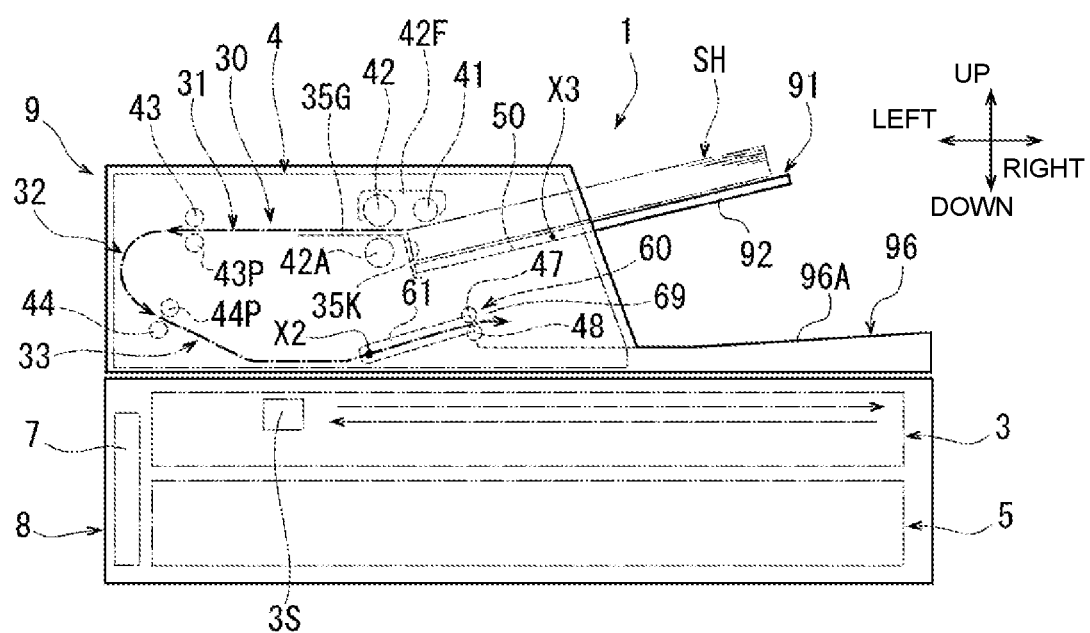
FIG. 2 is a schematic front view illustrating the image reading device according to the first embodiment.

As illustrated in FIG. 1, an image reading device 1 of a first embodiment is an example of a specific aspect of the image reading device of the present disclosure. In FIG. 1, a side on which an operation panel 8P is disposed is defined as a front side of a device, and a side which comes to the left when facing the operation panel 8P is defined as a left side thereof, thereby displaying h respective directions of front, rear, left, right, upper, and lower sides. Then, each direction illustrated in each drawing from FIG. 2 is displayed corresponding to each direction illustrated in FIG. 1. Hereinafter, respective components provided in the image reading device 1 will be described with reference to the accompanying drawings.

<Overall Configuration>

As illustrated in FIGS. 1 to 4, the image reading device 1 includes a main body 8, an opening and closing part 9, an image forming unit 5, a reading unit 3, an automatic conveyance mechanism 4, and a controller 7. The main body 8 is a flat and approximately box-shaped body. As illustrated in FIG. 1, the operation panel 8P which is a touch panel, and the like is provided on a front surface of the main body 8.

Figure 5:
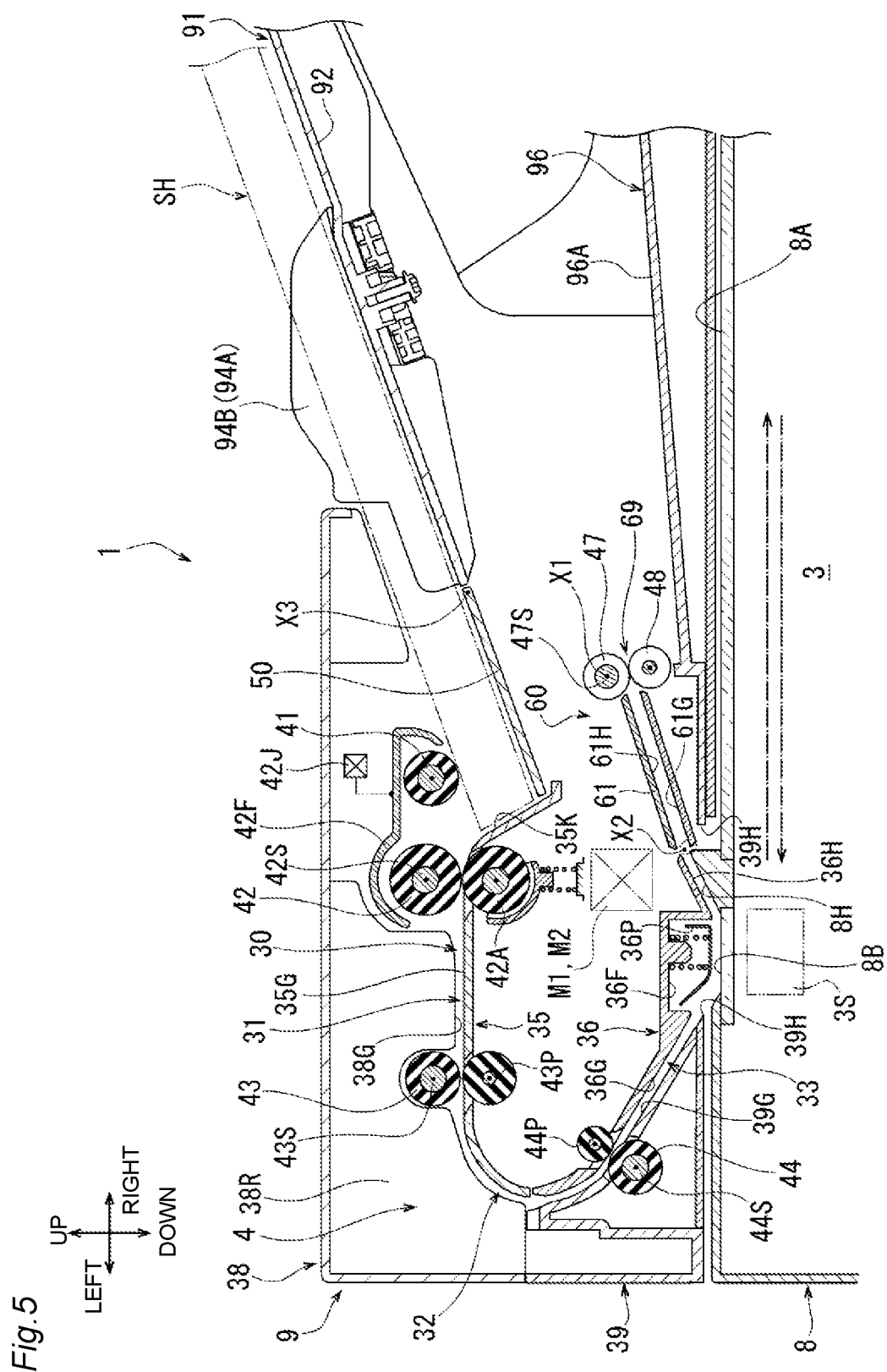
FIG. 5 is a partial cross-sectional view illustrating the image reading device according to the first embodiment.

As illustrated in FIG. 2, the image forming unit 5 is stored at a lower portion in the main body 8. The image forming unit 5 forms an image on a sheet by an ink jet method, a laser method, or the like. As illustrated in FIGS. 2 and 5, the reading unit 3 is positioned at an upper portion in the main body 8. The reading unit 3 is used when reading an image on a document. The automatic conveyance mechanism 4 is provided in the opening and closing part 9. The automatic conveyance mechanism 4 is used when allowing the reading unit 3 to read an image on a sheet SH while sequentially conveying the sheet SH supported by a supply tray 91 along a conveyance guide 30.

Figure 4:
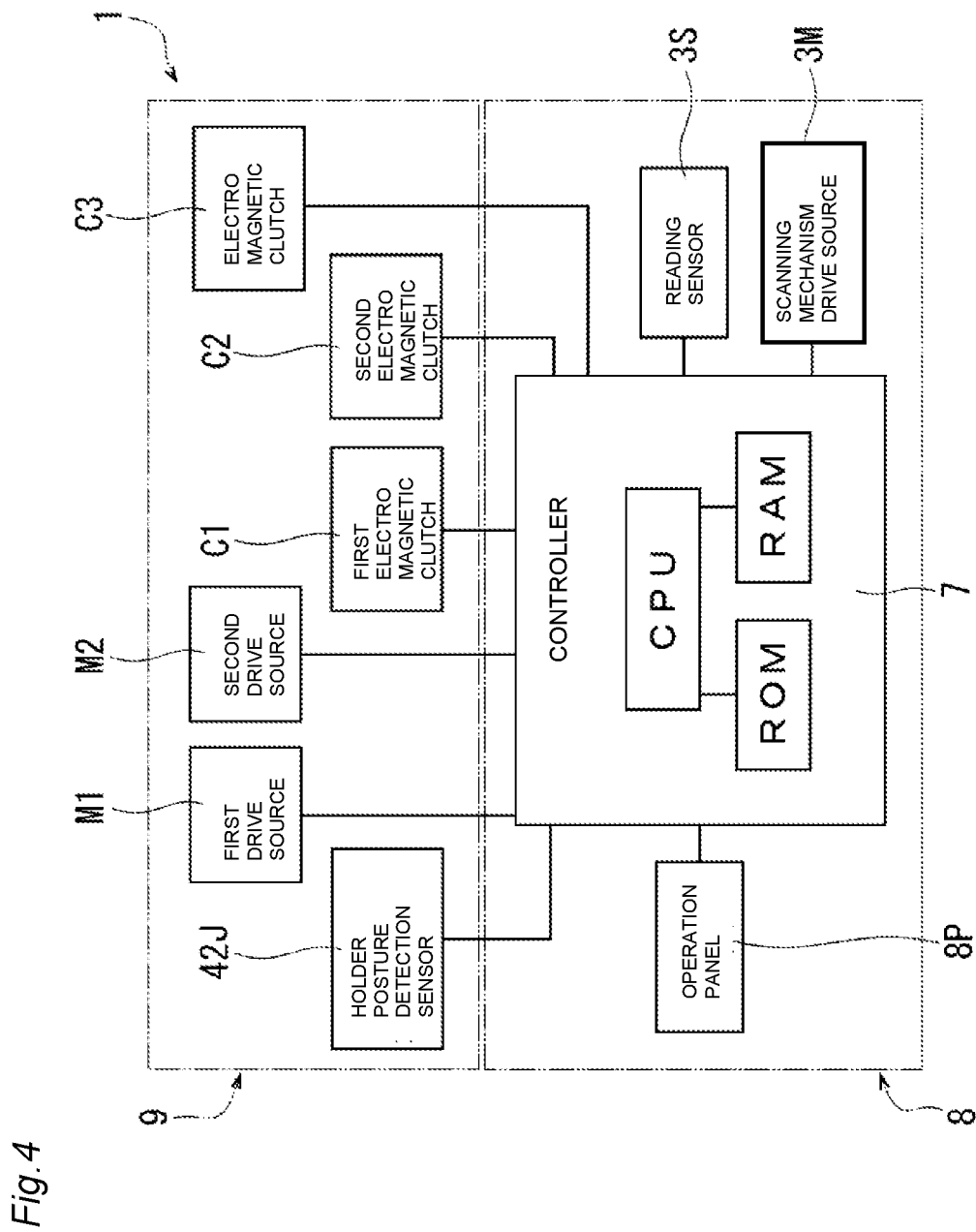
FIG. 4 is a block diagram illustrating the image reading device according to the first embodiment.

As illustrated in FIGS. 2 and 4, the controller 7 is stored at a position along a left side surface in the main body 8. The controller 7 is formed as a microcomputer mainly including a CPU, a ROM, and a RAM. The ROM stores a program for the CPU to control various operations of the image reading device 1, a program for performing identification processing, and the like. The RAM is used as a storage region for temporarily recording data and signals used when the CPU executes the programs, or as a work region for data processing. The controller 7 controls the image forming unit 5, the reading unit 3, the automatic conveyance mechanism 4, and the operation panel 8P.

As illustrated in FIG. 5, platen glass is disposed on an upper surface of the main body 8, and a document supporting surface 8A with a large area is formed by an upper surface of the platen glass. Further, another platen glass is disposed leftward further than the document supporting surface 8A on the upper surface of the main body 8, and an elongated reading surface 8B is formed in a front and rear direction by an upper surface of the another platen glass.

The document supporting surface 8A supports the document from below when the reading unit 3 reads an image on the document in a stationary state. The document which is an object to be read includes a sheet such as a paper, or an OHP sheet, as well as a book, and the like.

The reading surface 8B contacts the conveyed sheet SH from below when the reading unit 3 reads the image on the sheet SH conveyed one by one by the automatic conveyance mechanism 4. A guide protruding unit 8H is provided between the document supporting surface 8A and the reading surface 8B on the upper surface of the main body 8. The guide protruding unit 8H scoops up the sheet SH to be conveyed while contacting the reading surface 8B and guides the sheet SH so as to be inclined upward to the right.

Further, in the embodiment, an object whose image is read by using the document supporting surface 8A is described as a document, and an object whose image is read while being conveyed by the automatic conveyance mechanism 4 is described as a sheet. The document and the sheet may be substantially the same.

As illustrated in FIG. 1, the opening and closing part 9 is supported to be able to swing around an opening and closing axis center X9 extending in the left and right direction by a hinge, which is not illustrated and disposed at a rear end part of the main body 8. The opening and closing part 9 covers the document supporting surface 8A and the reading surface 8B from above in a closed state illustrated in FIGS. 1 and 5, and the like. Although the drawing is omitted, the opening and closing part 9 displaces the document supporting surface 8A and the reading surface 8B to an open position where the document supporting surface 8A and the reading surface 8B are exposed by swinging around the opening and closing axis center X9 so that the front end part thereof is displaced upward and rearward. Accordingly, a user can support the document which is an object to be read on the document supporting surface 8A.

Further, when describing a configuration, an internal structure, and the like of the opening and closing part 9, a posture of the opening and closing part 9 in a closed state is set as a reference in the up and down direction and the front and rear direction.

The reading unit 3 includes a reading sensor 3S stored at an upper portion in the main body 8 as illustrated in FIGS. 2 to 6, a scanning mechanism drive source 3M illustrated in FIG. 4, and a scanning mechanism, which is not illustrated and driven by the scanning mechanism drive source 3M. As the reading sensor 3S, a well-known image reading sensor such as a contact image sensor (CIS), a charge coupled device (CCD), and the like is used.

As illustrated in FIG. 5, the reading sensor 3S is positioned below the document supporting surface 8A and the reading surface 8B. The scanning mechanism, which is not illustrated, is driven by the scanning mechanism drive source 3M when reading the image on the document supported by the document supporting surface 8A, and the reading sensor 3S is reciprocated in the left and right direction below the document supporting surface 8A in the main body 8. Further, the scanning mechanism, which is not illustrated, is driven by the scanning mechanism drive source 3M when the reading sensor 3S reads the image on the sheet SH conveyed by the automatic conveyance mechanism 4, and the reading sensor 3S is stopped under the reading surface 8B in the main body 8. A position where the reading sensor 3S is stopped under the reading surface 8B is a predetermined stationary reading position.

Figure 6:
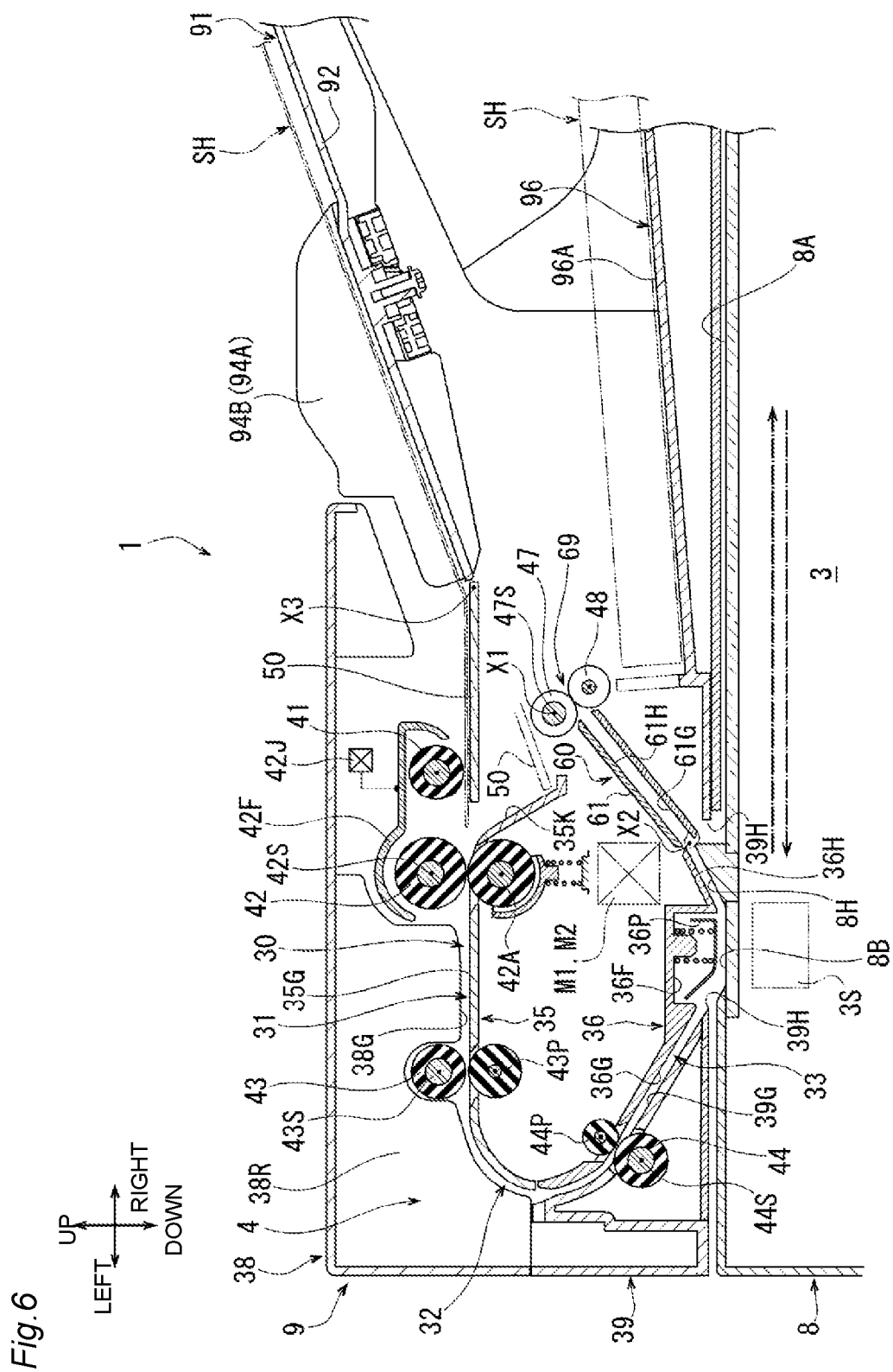
FIG. 6 is a partial cross-sectional view illustrating the image reading device according to the first embodiment.

As illustrated in FIGS. 5 and 6, the opening and closing part 9 includes a base member 39, a first chute member 35, a second chute member 36, and a cover member 38.

The base member 39 forms a bottom wall of the opening and closing part 9. In the base member 39, a rectangular hole 39H in which a region opposite to the reading surface 8B and the guide protruding unit 8H is cut out in an approximately rectangular shape is formed. A conveyance surface 39G is formed at a portion positioned leftward further than the rectangular hole 39H in the base member 39. A left end part of the conveyance surface 39G is curved to be inclined downward to the right by changing a direction from a downward direction. The conveyance surface 39G is inclined downward to a left end edge of the rectangular hole 39H.

The second chute member 36 is disposed above a left portion of the base member 39. A pressing member holding part 36F and guide surfaces 36G and 36H are formed in the second chute member 36. The pressing member holding part 36F is a recessed part which is recessed upward at a position opposite to the reading surface 8B. In the pressing member holding part 36F, a pressing member 36P is held to be able to be displaced in the up and down direction. The pressing member 36P presses the sheet SH which is conveyed while contacting the reading surface 8B from above, thereby preventing the sheet SH from floating from the reading surface 8B. The guide surface 36G is positioned leftward further than the pressing member holding part 36F. A left end part of the guide surface 36G is curved along the left end part of the conveyance surface 39G of the base member 39. The guide surface 36G is inclined downward to the right along a portion inclined downward of the conveyance surface 39G of the base member 39. The guide surface 36H is positioned rightward further than the pressing member holding part 36F. The guide surface 36H is inclined upward to the right along the guide protruding unit 8H of the main body 8.

The first chute member 35 is disposed above the second chute member 36. A regulation surface 35K and a conveyance surface 35G are formed in the first chute member 35. The regulation surface 35K is inclined upward to the left from a right end part of the first chute member 35. The conveyance surface 35G is connected to an upper end of the regulation surface 35K and extends approximately horizontally to the left. A left end part of the conveyance surface 35G is curved so as to change a direction thereof from the left direction to the downward direction.

The cover member 38 is disposed above the first chute member 35. A guide surface 38G which is formed of lower end edges of a plurality of ribs 38R protruding downward is formed in the cover member 38. A right end part of the guide surface 38G is opposite to the conveyance surface 35G from above at a position deviated to the left side further than a connection part between the regulation surface 35K and the conveyance surface 35G in the first chute member 35. The guide surface 38G extends approximately horizontally to the left along the conveyance surface 35G of the first chute member 35. A left end part of the guide surface 38G is curved along the left end part of the conveyance surface 35G of the first chute member 35.

Figure 7:
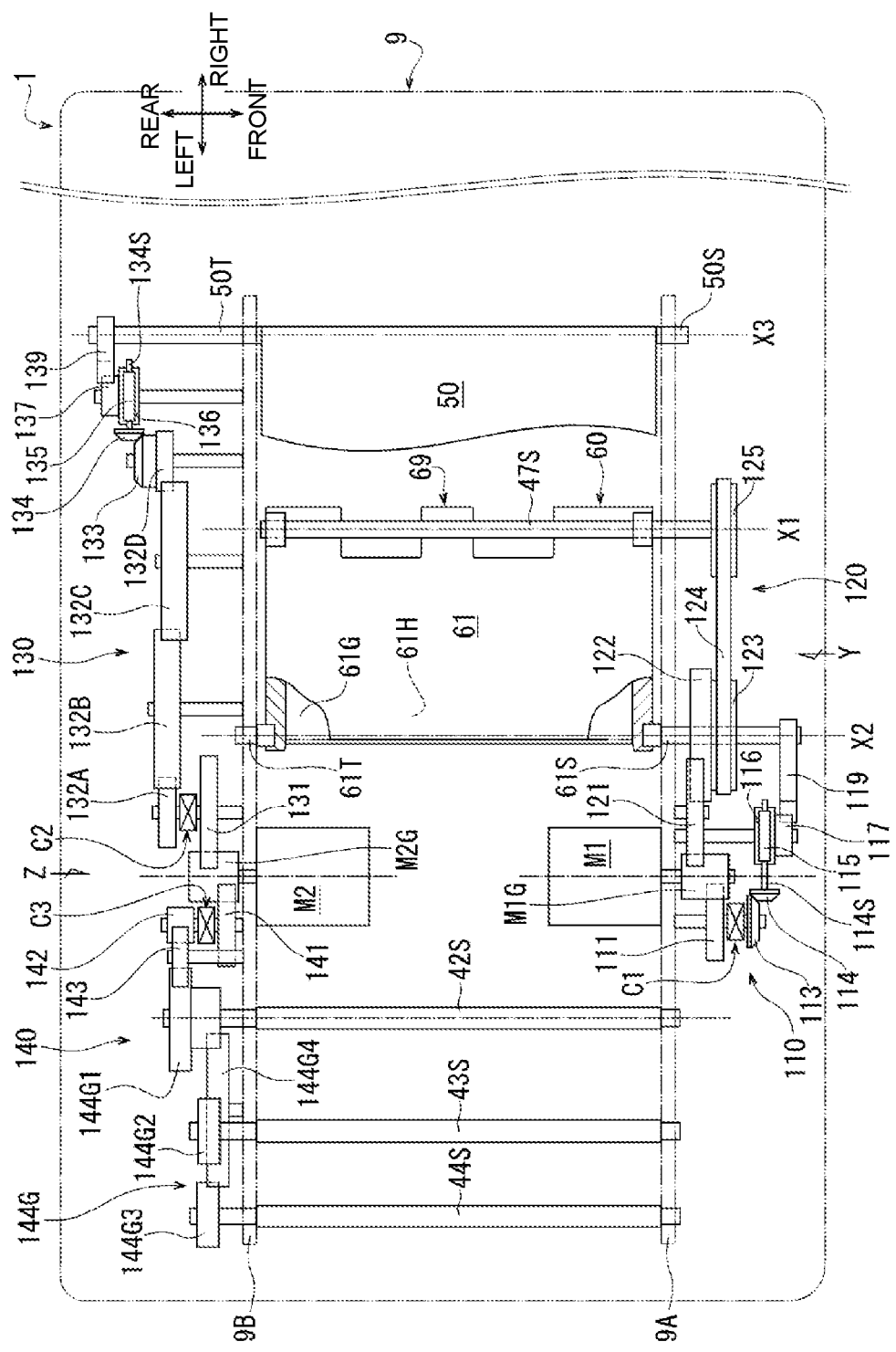
FIG. 7 is a schematic top view illustrating the image reading device according to the first embodiment.

As illustrated in FIG. 7, the opening and closing part 9 includes a first side frame 9A and a second side frame 9B. The first side frame 9A is disposed to extend in the left and right direction on a front side of the opening and closing part 9. The second side frame 9B is disposed to extend in the left and right direction on a rear side of the opening and closing part 9. The first side frame 9A and the second side frame 9B form a part of internal frames of the opening and closing part 9, respectively.

Figure 8:
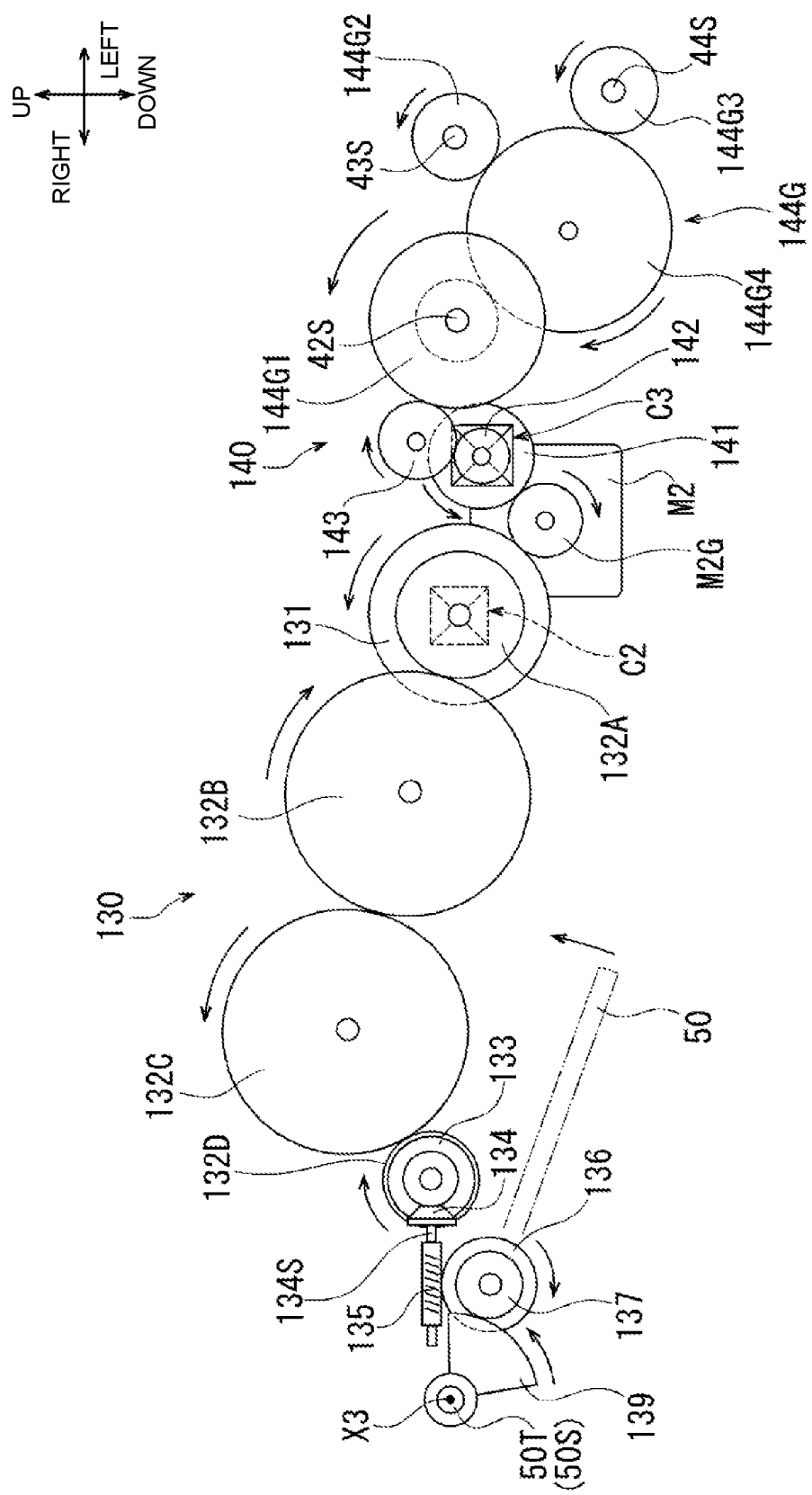
FIG. 8 is a schematic diagram illustrating a movable plate, a second drive source, a third drive train, a fourth drive train, and the like when viewed from an arrow Z direction in FIG. 7, and is a diagram illustrating a state in which the movable plate is disposed at a first position.

The first side frame 9A and the second side frame 9B are opposite to each other in the front and rear direction so that the guide surface 38G of the cover member 38, the regulation surface 35K and the conveyance surface 35G of the first chute member 35, the guide surfaces 36G and 36H of the second chute member 36, and the conveyance surface 39G of the base member 39, all of which are illustrated in FIG. 5, and the like, are sandwiched therebetween. Further, in FIG. 7, illustration of a supply tray main body 92 of the supply tray 91 is omitted for ease of description. Additionally, FIG. 7 illustrates that positions of a first drive source M1 and a second drive source M2 are deviated to the right side from a position lower than a rotation shaft 42S of a separation roller 42 for ease of description. Further, FIG. 8 illustrates that the position of the second drive source M2 is deviated to the right side from the position lower than the rotation shaft 42S of the separation roller 42.

As illustrated in FIGS. 2, 3, 5 and 6, the opening and closing part 9 includes the conveyance guide 30 forming a part of the automatic conveyance mechanism 4, the supply tray 91 for supporting the sheet SH supplied to the conveyance guide 30, and a discharge tray 96 for supporting the sheet SH discharged from the conveyance guide 30.

As illustrated in FIG. 5, the supply tray 91 is positioned rightward further than the first chute member 35, and is disposed above a right portion of the base member 39. The supply tray 91 includes the supply tray main body 92 and a movable plate 50. The supply tray main body 92 is gently inclined downward from a right end part side of the opening and closing part 9 to the left. The movable plate 50 is disposed to be adjacent to a left end part of the supply tray main body 92. The movable plate 50 extends in an approximately flat plate shape toward the regulation surface 35K of the first chute member 35. The movable plate 50 is covered with a right portion of the cover member 38 from above. The supply tray 91 supports the sheet SH supplied to the automatic conveyance mechanism 4 by the supply tray main body 92 and the movable plate 50.

As illustrated in FIG. 7, the movable plate 50 includes shaft units 50S and 50T having a third axis center X3 extending in the front and rear direction as an axis center.

The front shaft unit 50S is a cylindrical shaft protruding forward from a front and right corner part of the movable plate 50. The front shaft unit 50S is rotatably supported by the first side frame 9A. The rear shaft unit 50T is a cylindrical shaft protruding rearward from a rear and right corner part of the movable plate 50. The rear shaft unit 50T is rotatably supported by the second side frame 9B and protrudes rearward further than the second side frame 9B. Accordingly, the movable plate 50 is rotatable around the third axis center X3.

Figure 3:
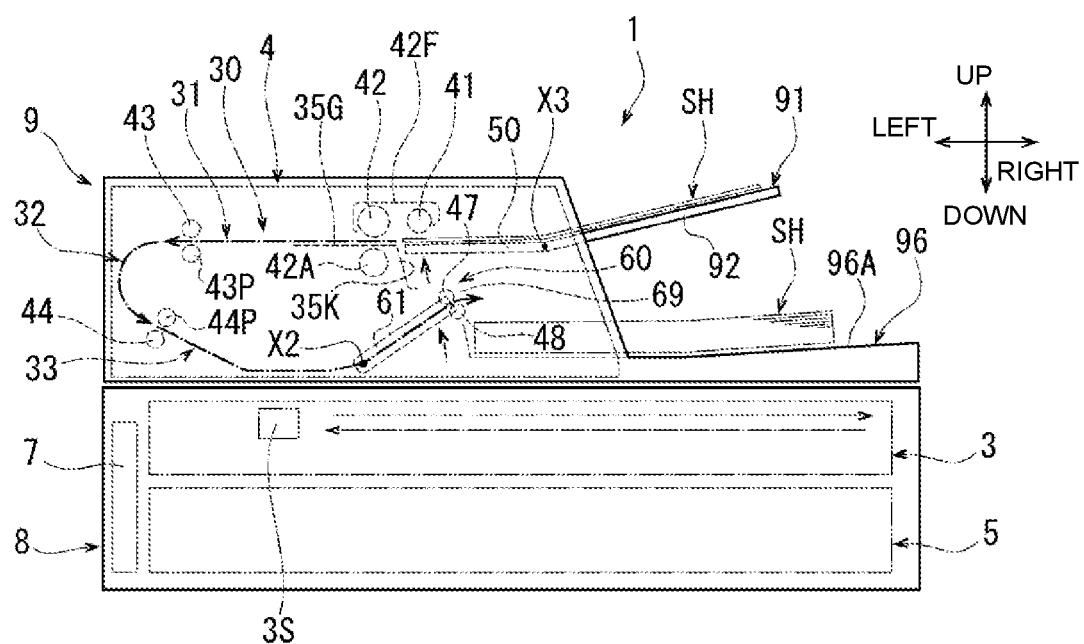
FIG. 3 is a schematic front view illustrating the image reading device according to the first embodiment.

As will be described later in detail, the movable plate 50 is configured to rotate from a first position illustrated in FIGS. 2, 5, and 8 to a second position illustrated in FIGS. 3, 6, and 10 by operating the second drive source M2, a third drive train 130 and a second electromagnetic clutch C2 illustrated in FIGS. 7 and 8, and the like corresponding to the decrease of the sheets SH supported by the supply tray 91. The second position illustrated in FIG. 6 and the like is a position higher than the first position illustrated in FIG. 5 and the like.

As illustrated in FIGS. 1 and 5, two width regulation guides 94A and 94B are provided on the supply tray main body 92 to be respectively slidable in the front and rear direction. A plurality of types of the sheets SH having a different size supported by the supply tray 91 are sandwiched from the front side and the rear side in such a manner that the front width regulation guide 94A and the rear width regulation guide 94B approach each other or are separated from each other. Accordingly, the sheets SH having various sizes can be determined to be positioned based upon a center part in a width direction of the supply tray 91 as a reference.

As illustrated in FIG. 5, the discharge tray 96 is formed on the right portion of the base member 39. That is, the discharge tray 96 is provided so as to be overlapped with the supply tray 91 at a position lower than the supply tray 91. In the discharge tray 96, an image is read by the reading sensor 3S, and then the sheet SH conveyed by the automatic conveyance mechanism 4 is discharged. An upper surface of the discharge tray 96 is formed as a sheet supporting surface 96A for supporting the sheet SH to be discharged.

The conveyance guide 30 forms a conveyance path for conveying the sheet SH from the supply tray 91 toward the discharge tray 96. Specifically, the conveyance guide 30 includes a first guide 31, a second guide 32, and a third guide 33.

The first guide 31 is configured to include an approximately horizontally extending portion of the conveyance surface 35G of the first chute member 35 and an approximately horizontally extending portion of the guide surface 38G of the cover member 38. The first guide 31 guides the sheet SH to be sent out from the supply tray 91 to the left.

The second guide 32 is configured to include the curved left end part of the conveyance surface 35G of the first chute member 35; the curved left end part of the guide surface 38G of the cover member 38; the curved left end part of the conveyance surface 39G of the base member 39; and the curved left end part of the guide surface 36G of the second chute member 36. The second guide 32 is connected to the first guide 31 and changes the conveyance direction of the sheet SH from the left direction to the right direction.

The third guide 33 is configured to include a downwardly inclined portion of the conveyance surface 39G of the base member 39; a downwardly inclined portion of the guide surface 36G of the second chute member 36; and the guide surface 36H of the second chute member 36. The third guide 33 is connected to the second guide 32 and guides the sheet SH toward the discharge tray 96.

The automatic conveyance mechanism 4 includes a discharge unit 60 for discharging the sheet SH guided by the third guide 33 to the discharge tray 96. The discharge unit 60 is formed by unitizing a discharge guide 61, a discharge roller 47, and a discharge pinch roller 48.

A conveyance surface 61G and a guide surface 61H are formed in the discharge guide 61. The conveyance surface 61G is positioned rightward further than the guide protruding unit 8H of the main body 8 and is inclined upward to the right. The guide surface 61H is positioned rightward further than the guide surface 36H of the second chute member 36. The guide surface 61H is inclined upward to the right along the conveyance surface 61G The discharge guide 61 includes a discharge opening 69 for discharging the sheet SH to the discharge tray 96. The discharge opening 69 is opened between a right end part of the conveyance surface 61G and a right end part of the guide surface 61H.

As illustrated in FIG. 7, in the discharge unit 60, the discharge guide 61 is an approximately angular cylindrical member in which a flat plate on which the conveyance surface 61G is formed and a flat plate on which the guide surface 61H is formed are opposite to each other in the up and down direction, and a front end edge and a rear end edge of the both flat plates are connected to each other by a pair of front and rear side plates. The discharge guide 61 includes shaft units 61S and 61T in which a second axis center X2 extending in the front and rear direction is set as an axis center. The second axis center X2 is parallel with the third axis center X3.

The front shaft unit 61S is a cylindrical shaft protruding forward from a front and left corner part of the conveyance surface 61G and the guide surface 61H. The front shaft unit 61S is rotatably supported by the first side frame 9A and protrudes forward further than the first side frame 9A.

The rear shaft unit 61T is a cylindrical shaft protruding rearward from a rear and left corner part of the conveyance surface 61G and the guide surface 61H. The rear shaft unit 61T is rotatably supported by the second side frame 9B.

Accordingly, the discharge guide 61 is rotatable around the second axis center X2. As illustrated in FIG. 5, a position of the second axis center X2 is set so as to be overlapped with a conveyance path formed by the third guide 33 of the conveyance guide 30 and the discharge guide 61.

In the discharge unit 60, the discharge roller 47 is disposed above the discharge opening 69, and the discharge pinch roller 48 is disposed below the discharge opening 69. Although not illustrated herein, a plurality of sets of discharge rollers 47 and discharge pinch rollers 48 are disposed to be spaced apart from each other in the front and rear direction.

The discharge roller 47 is fixed to a rotation shaft 47S having the first axis center X1 parallel with the second axis center X2 as an axis center. As illustrated in FIG. 7, a front end part of the rotation shaft 47S is rotatably supported at a front and right corner part of the discharge guide 61. The front end part of the rotation shaft 47S protrudes forward further than the first side frame 9A. A rear end part side of the rotation shaft 47S is rotatably supported at a rear and right corner part of the discharge guide 61. Accordingly, the discharge roller 47 is supported by the discharge guide 61 to be rotatable around the first axis center X1. While the position of the second axis center X2 is constant, a position of the first axis center X1 varies depending on the rotation of the discharge guide 61.

Figure 9:
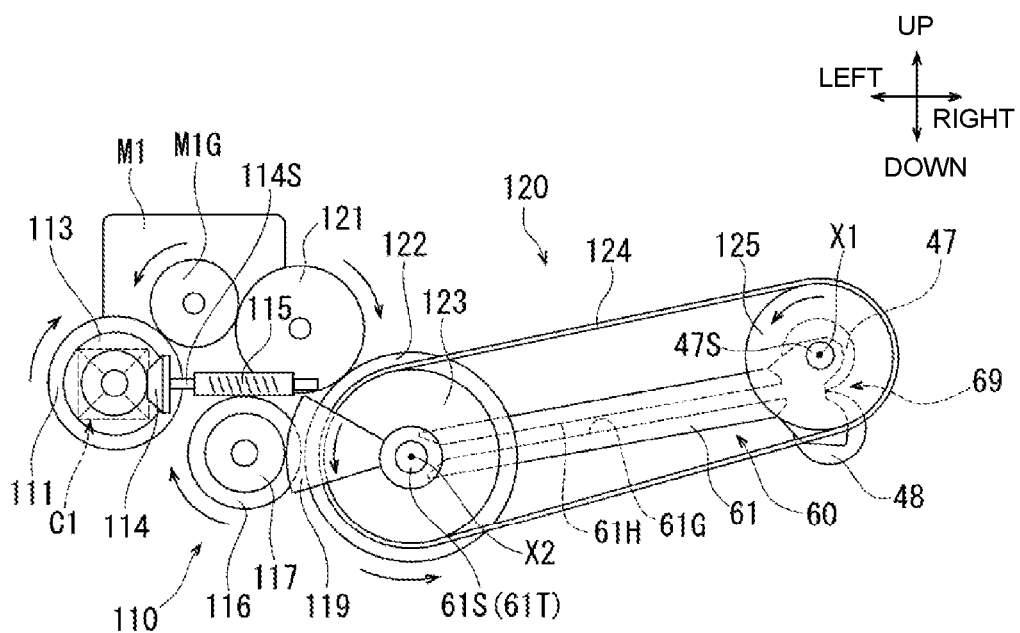
FIG. 9 is a schematic diagram illustrating a discharge unit, a first drive source, a first drive train, a second drive train, and the like when viewed from an arrow Y direction in FIG. 7, and is a diagram illustrating a state in which the discharge unit is disposed at a third position.

As illustrated in FIGS. 5 and 9, the discharge pinch roller 48 is rotatably supported at a right end part of the discharge guide 61 and is opposite to the discharge roller 47 from below. The conveyance surface 61G and the guide surface 61H of the discharge guide 61 guide the sheet SH toward a nip position between the discharge roller 47 and the discharge pinch roller 48.

As will be described later in detail, the discharge unit 60 is configured to rotate from a third position illustrated in FIGS. 2, 5, and 9 to a fourth position illustrated in FIGS. 3, 6, and 11 by operating the first drive source M1, a first drive train 110, and a first electromagnetic clutch C1 illustrated in FIGS. 7, 9, and 11 corresponding to the decrease of the sheets SH supported by the supply tray 91. The fourth position illustrated in FIG. 6 and the like is a position above the third position illustrated in FIG. 5 and the like.

As illustrated in FIG. 5, the automatic conveyance mechanism 4 includes a supply roller 41, the separation roller 42, a retard roller 42A, a first conveyance roller 43, a first pinch roller 43P, a second conveyance roller 44, a second pinch roller 44P, the discharge roller 47, and the discharge pinch roller 48 for conveying the sheet SH along the conveyance guide 30.

The supply roller 41, the separation roller 42, the first conveyance roller 43, and the second conveyance roller 44 are an example of the conveyance roller of the present disclosure. The discharge roller 47 and the discharge pinch roller 48 are a part of the discharge unit 60 described above.

As illustrated in FIG. 7, the rotation shaft 42S of the separation roller 42, a rotation shaft 43S of the first conveyance roller 43, and a rotation shaft 44S of the second conveyance roller 44 are rotatably supported by the first side frame 9A and the second side frame 9B. Respective rear end parts of the rotation shafts 42S, 43S, and 44S protrude rearward further than the second side frame 9B.

<Configuration of First Drive Source and Second Drive Source>

The automatic conveyance mechanism 4 includes the first drive source M1 illustrated in FIGS. 4 to 7, 9 and 11, and the second drive source M2 illustrated in FIGS. 4 to 8, and 10. As illustrated in FIG. 5, the first drive source M1 and the second drive source M2 are disposed between the first guide 31 and the third guide 33.

As illustrated in FIG. 7, the first drive source M1 is mounted on a surface facing a rear side of the first side frame 9A. A drive shaft of the first drive source M1 protrudes forward further than the first side frame 9A, and a drive gear M1G is fixed to the drive shaft thereof. In the embodiment, the first drive source M1 is a stepping motor. The first drive source M1 generates a drive force by being controlled by the controller 7, thereby rotating the drive gear M1G clockwise and counter-clockwise in FIGS. 9 and 11.

As illustrated in FIG. 7, the second drive source M2 is mounted on a surface facing a front side of the second side frame 9B. A drive shaft of the second drive source M2 protrudes rearward further than the second side frame 9B, and a drive gear M2G is fixed to the drive shaft thereof. In the embodiment, the second drive source M2 is a stepping motor. The second drive source M2 generates a drive force by being controlled by the controller 7, thereby rotating the drive gear M2G clockwise and counter-clockwise in FIGS. 8 and 10.

<Configuration of Fourth Drive Train>

As illustrated in FIGS. 7 and 8, the automatic conveyance mechanism 4 includes a fourth drive train 140 for transmitting a drive force from the second drive source M2 to the supply roller 41, the separation roller 42, the first conveyance roller 43, and the second conveyance roller 44. As illustrated in FIG. 7, the fourth drive train 140 is disposed rearward further than the second side frame 9B and is supported by a plurality of shaft units protruding rearward from the second side frame 9B.

Further, in the embodiment, with respect to each gear forming the fourth drive train 140, illustration of gear teeth formed on the outer peripheral surface is omitted in FIGS. 7 and 8. A plurality of arrows attached to the fourth drive train 140 in FIG. 8 indicate a rotation direction when the drive gear M2G rotates clockwise in FIG. 8 and an electromagnetic clutch C3 is in a connected state.

As illustrated in FIGS. 7 and 8, the fourth drive train 140 includes a gear 141, the electromagnetic clutch C3, a gear 142, a gear 143, and a plurality of gear groups 144G.

The gear 141 is positioned leftward and upward with respect to the drive gear M2G and is engaged with the drive gear M2G The gear 141 is connected to an input side of the electromagnetic clutch C3. The gear 142 is connected to an output side of the electromagnetic clutch C3.

The electromagnetic clutch C3 includes a solenoid, which is not illustrated, and controlled and moved by the controller 7, and a clutch mechanism, which is not illustrated and switched between a connected state and a cut-off state by the action of the solenoid. As the clutch mechanism, it is possible to use a well-known clutch mechanism having a configuration in which clutch plates are in contact with each other or separated from each other, and a configuration in which the rotation of a part of a gear group including a planetary gear is allowed or regulated, and the like.

The gear 143 is positioned upward with respect to the gear 142 and is engaged with the gear 142. The plurality of gear groups 144G include gears 144G1, 144G2, 144G3, and 144G4. The gear 144G1 is engaged with the gear 143.

The second drive source M2 rotates the drive gear M2G clockwise in FIG. 8, and the drive force from the second drive source M2 is transmitted to the gear 144G1 via the gear 141, and the electromagnetic clutch C3 and the gears 142 and 143 in the connected state, whereby the gear 144G1 rotates integrally with the rotation shaft 42S of the separation roller 42. The gear 144G2 rotates integrally with the rotation shaft 43S of the first conveyance roller 43 by transmitting the drive force from the gear 144G1 via the gear 144G4. The gear 144G3 rotates integrally with the rotation shaft 44S of the second conveyance roller 44 by transmitting the drive force from the gear 144G1 via the gear 144G4. Further, when the jammed sheet SH in the conveyance guide 30 is removed, the electromagnetic clutch C3 is put into the cut-off state, whereby the gears 144G1, 144G2, and 144G3 become free to rotate. As a result, the jammed sheet SH can be easily removed.

The plurality of gear groups 144G transmit the drive force from the second drive source M2 to the rotation shaft 42S of the separation roller 42, the rotation shaft 43S of the first conveyance roller 43, and the rotation shaft 44S of the second conveyance roller 44 to rotate the separation roller 42, the first conveyance roller 43, and the second conveyance roller 44 in a direction in which the sheet SH is conveyed toward the reading sensor 3S which is stopped at a stationary reading position, that is, counter-clockwise in FIG. 8.

<Configuration of Second Drive Train>

Figure 11:
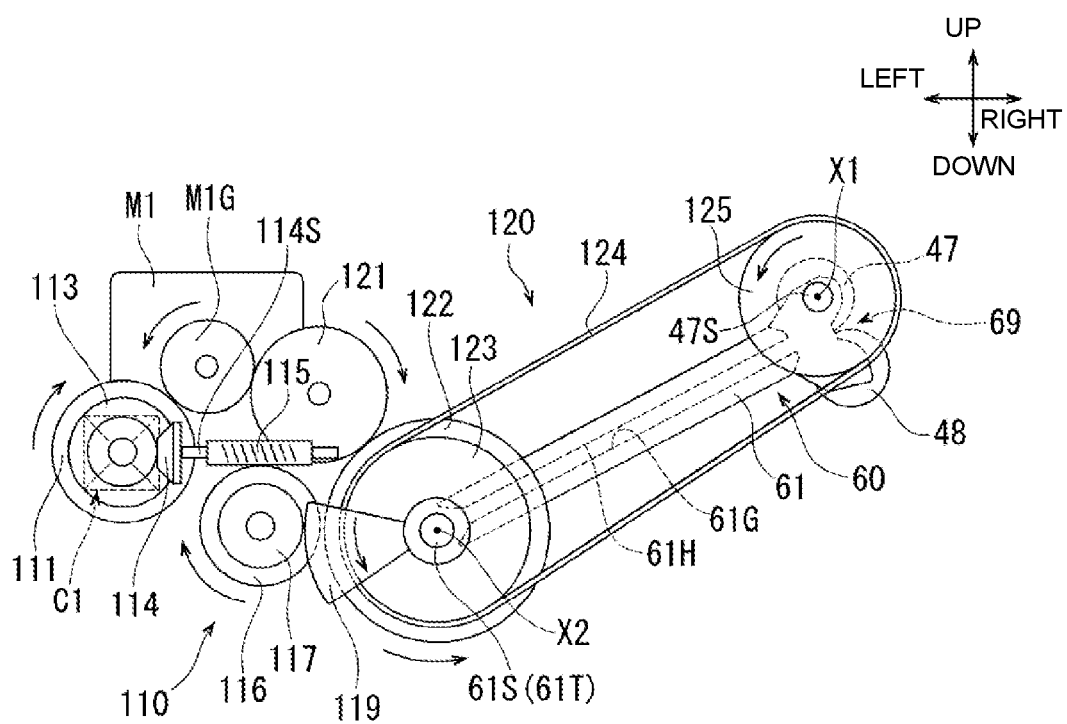
FIG. 11 is a schematic diagram same as that of FIG. 9, and is a diagram illustrating a state in which the discharge unit is moved to a fourth position.

As illustrated in FIGS. 7, 9, and 11, the automatic conveyance mechanism 4 includes a second drive train 120 for transmitting the drive force from the first drive source M1 to the discharge roller 47. As illustrated in FIG. 7, the second drive train 120 is disposed forward further than the first side frame 9A and is supported by a plurality of shaft units protruding forward from the first side frame 9A.

Further, in the embodiment, with respect to each gear forming the second drive train 120, illustration of gear teeth formed on the outer peripheral surface is omitted in FIGS. 7, 9, and 11. A plurality of arrows attached to the second drive train 120 in FIGS. 9 and 11 indicate a rotation direction when the drive gear M1G rotates counter-clockwise in FIGS. 9 and 11.

As illustrated in FIGS. 7 and 9, the second drive train 120 includes a gear 121, a gear 122, a pulley 123, a timing belt 124, and a pulley 125.

The gear 121 is positioned rightward with respect to the drive gear M1G and is engaged with the drive gear M1G. The gear 122 is positioned rightward and downward with respect to the gear 121 and is engaged with the gear 121. The gear 122 and the pulley 123 are formed as one member. The pulley 123 is disposed on the front side of the gear 122. The gear 122 and the pulley 123 are inserted into the shaft unit 61S in front of the discharge guide 61 to be rotatable independently. The pulley 123 is rotatable around the second axis center X2 integrally with the gear 122.

The pulley 125 is fixed to the front end part of the rotation shaft 47S of the discharge roller 47. The pulley 125 is rotatable around the first axis center X1 together with the rotation shaft 47S of the discharge roller 47. The timing belt 124 is wound around the pulley 123 and the pulley 125. The timing belt 124 transmits the drive force from the first drive source M1 from the pulley 123 to the pulley 125.

When the first drive source M1 rotates the drive gear M1G counter-clockwise in FIGS. 9 and 11, the gears 121 and 122, the pulley 123, the timing belt 124, and the pulley 125 transmit the drive force from the first drive source M1 to the rotation shaft 47S of the discharge roller 47, whereby the discharge roller 47 rotates in a direction in which the sheet SH is discharged through the discharge opening 69 to the discharge tray 96, that is, counter-clockwise illustrated in FIGS. 9 and 11.

A gap between the second axis center X2 of the pulley 123 and the first axis center X1 of the pulley 125 does not change even though the discharge guide 61 rotates. Therefore, when the discharge guide 61 stops and when the discharge guide 61 rotates, tension of the timing belt 124 hardly fluctuates, and therefore the drive force can be appropriately transmitted from the pulley 123 to the pulley 125.

Accordingly, when the discharge guide 61 stops and when the discharge guide 61 rotates, the second drive train 120 transmits the drive force from the first drive source M1 to the discharge roller 47, thereby enabling to discharge the sheet SH through the discharge opening 69 by the discharge roller 47.

<Schematic Configurations of Supply Roller, Separation Roller, First and Second Conveyance Rollers, and the Like>

As illustrated in FIG. 5, the separation roller 42 is disposed at a position deviated to the left side further than the connection part between the regulation surface 35K and the conveyance surface 35G in the first chute member 35.

A holder 42F is rotatably supported in the rotation shaft 42S of the separation roller 42. The holder 42F protrudes rightward so as to be separated from the rotation shaft 42S and to exceed the regulation surface 35K.

The supply roller 41 is rotatably held at a right end part of the holder 42F. The supply roller 41 is provided at a position opposite to the movable plate 50 from above. The rotation shaft 42S and a transmission gear group, which is not illustrated and provided in the holder 42F, transmit the drive force from the second drive source M2 to the supply roller 41, thereby rotating the supply roller 41 in a direction in which the sheet SH supported by the supply tray 91 is sent out to the conveyance guide 30. The supply roller 41 can be displaced in the up and down direction depending on the rotation of the holder 42F.

A holder posture detection sensor 42J is provided in the opening and closing part 9. The holder posture detection sensor 42J detects whether or not a posture of the holder 42F is an appropriate posture illustrated in FIGS. 5 and 6 and transmits the detected posture to the controller 7. In a state where the holder 42F is in the appropriate posture illustrated FIGS. 5 and 6, a lower end part of the supply roller 41 has approximately the same height as the conveyance surface 35G of the first chute member 35. In this state, the supply roller 41 can appropriately send out the uppermost sheet SH among the sheets SH supported by the supply tray 91 toward the conveyance surface 35G, that is, toward a space between the separation roller 42 and the retard roller 42A.

The retard roller 42A is supported by the first chute member 35 at a position just below the separation roller 42 and is pressed against the separation roller 42. When there exists one sheet SH to be nipped by the separation roller 42 and the retard roller 42A, rotation of the retard roller 42A is allowed by a torque limiter which is not illustrated. On the other hand, when there exist a plurality of sheets SH to be nipped by the separation roller 42 and the retard roller 42A, the rotation of the retard roller 42A is stopped by the torque limiter which is not illustrated. As a result, the retard roller 42A applies a force for stopping the conveyance of the sheet SH with respect to the sheet SH other than the sheet SH in contact with the separation roller 42.

The first conveyance roller 43 is disposed at a connection part between the first guide 31 and the second guide 32 to be opposite to the conveyance surface 35G of the first chute member 35 from above. The first pinch roller 43P is supported by the first chute member 35 and is pressed against the first conveyance roller 43. The first conveyance roller 43 and the first pinch roller 43P nip the sheet SH which is separated one by one by the separation roller 42 and the retard roller 42A, and then convey the nipped sheet SH toward the second guide 32.

The second conveyance roller 44 is disposed at a connection part between the second guide 32 and the third guide 33 to be opposite to the guide surface 36G of the second chute member 36 from below. The second pinch roller 44P is supported by the second chute member 36 and is pressed against the second conveyance roller 44. The second conveyance roller 44 and the second pinch roller 44P nip the sheet SH which is conveyed by the first conveyance roller 43 and the first pinch roller 43p, and then convey the nipped sheet SH toward the reading surface 8B, that is, toward the reading sensor 3S which is stopped at the stationary reading position.

The discharge roller 47 and the discharge pinch roller 48 nip the sheet SH which passes over the reading surface 8B and is guided by the discharge guide 61, after which the nipped sheet SH is discharged through the discharge opening 69 toward the discharge tray 96.

<Configuration of Third Drive Train>

Figure 10:
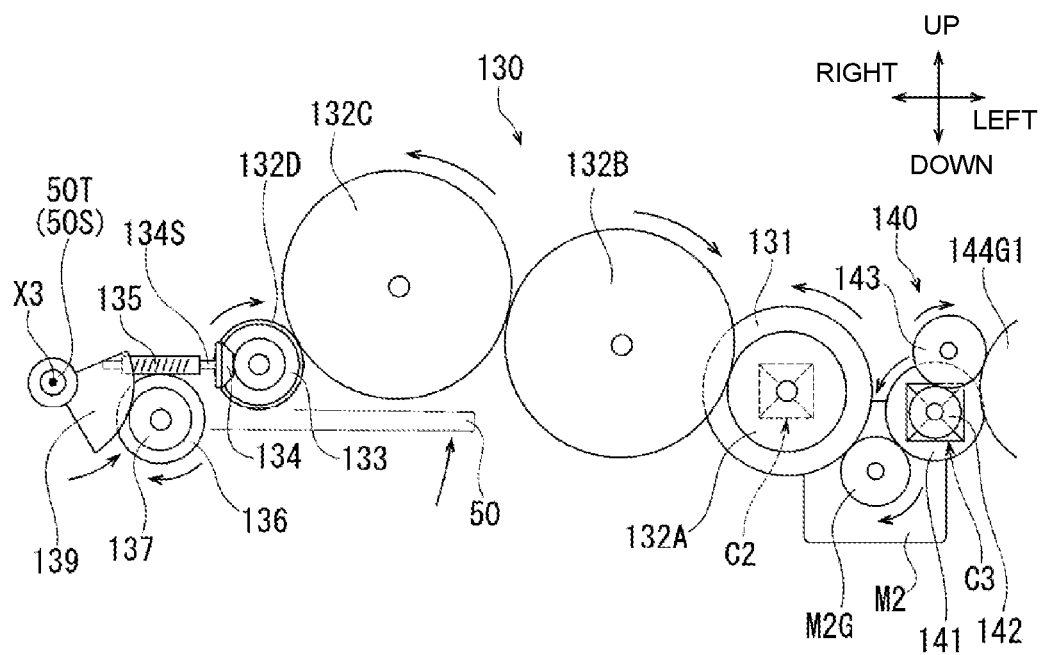
FIG. 10 is a schematic diagram same as that of FIG. 8, and is a diagram illustrating a state in which the movable plate is moved to a second position.

As illustrated in FIGS. 7, 8, and 10, the automatic conveyance mechanism 4 includes the third drive train 130 for rotating the movable plate 50 by transmitting the drive force from the second drive source M2 to the movable plate 50. Further, in the embodiment, with respect to each gear forming the third drive train 130, illustration of gear teeth formed on the outer peripheral surface is omitted in FIGS. 7 and 8, and the like.

A plurality of arrows attached to the third drive train 130 in FIGS. 8 and 10 indicate a rotation direction when the drive gear M2G rotates clockwise in FIG. 8 and the second electromagnetic clutch C2 is in a connected state. Further, when the drive gear M2G rotates counter-clockwise in FIGS. 8 and 10, the rotation direction becomes a rotation direction opposite to each arrow illustrated in FIGS. 8 and 10.

As illustrated in FIG. 7, the third drive train 130 is disposed rearward further than the second side frame 9B and is supported by the plurality of shaft units, and the like protruding in a rearward direction from the second side frame 9B.

As illustrated in FIGS. 7 and 8, the third drive train 130 includes a gear 131, the second electromagnetic clutch C2, a gear 132A, a gear 132B, a gear 132C, a gear 132D, a bevel gear 133, a bevel gear 134, a worm 135, a worm wheel 136, a gear 137, and a fan shaped gear 139.

The gear 131 is positioned rightward and upward with respect to the drive gear M2G and is engaged with the drive gear M2G The gear 131 is connected to an input side of the second electromagnetic clutch C2. The gear 132A is connected to an output side of the second electromagnetic clutch C2.

The second electromagnetic clutch C2 includes the solenoid, which is not illustrated, and controlled and moved by the controller 7, and the clutch mechanism, which is not illustrated and switched between the connected state and the cut-off state by the action of the solenoid. A configuration of the clutch mechanism is the same as that of the electromagnetic clutch C3.

The gear 132B is positioned rightward and upward with respect to the gear 132A and is engaged with the gear 132A. The gear 132C is positioned rightward and upward with respect to the gear 132B and is engaged with the gear 132B. The gear 132D is positioned rightward and downward with respect to the gear 132C and is engaged with the gear 132C.

The gear 132D and the bevel gear 133 are formed as one member. The bevel gear 133 is disposed on a rear side of the gear 132D. A rotation shaft 134S of the bevel gear 134 extends in the left and right direction orthogonal to a rotation shaft of the bevel gear 133. The bevel gear 134 is positioned rightward and rearward with respect to the bevel gear 133 and is engaged with the bevel gear 133.

The worm 135 is fixed to the rotation shaft 134S extending to the right side from the bevel gear 134, and is rotatable integrally with the bevel gear 134. The worm wheel 136 and the gear 137 are formed as one member. Rotation shafts of the worm wheel 136 and the gear 137 extend in the front and rear direction in parallel with the third axis center X3. The worm wheel 136 is positioned below the worm 135 and is engaged with the worm 135. The gear 137 is disposed on a rear side of the worm wheel 136 and has a diameter smaller than that of the worm wheel 136.

The fan shaped gear 139 is fixed to the shaft unit 50T on a rear side of the movable plate 50. The fan shaped gear 139 is positioned rightward with respect to the gear 137 and is engaged with the gear 137. When the fan shaped gear 139 rotates, the movable plate 50 rotates integrally with the fan shaped gear 139.

Next, an operation of the third drive train 130 will be described. When the second electromagnetic clutch C2 is in the cut-off state, even though the movable plate 50 attempts to fall down by an own weight thereof, a force at that time is transmitted to the worm 135 and the worm wheel 136, whereby the worm 135 and the worm wheel 136 are self-locked. Therefore, the movable plate 50 that is connected to the second electromagnetic clutch C2 via the worm 135 and the worm wheel 136 does not fall down, and is maintained at the position.

When the second drive source M2 rotates the drive gear M2G clockwise in FIG. 8 and the second electromagnetic clutch C2 is further in the connected state by the control of the controller 7, the third drive train 130 transmits the drive force from the second drive source M2 to the movable plate 50 by the operation of the gear 131, the gears 132A to 132D, the bevel gears 133 and 134, the worm 135, the worm wheel 136, the gear 137, and the fan shaped gear 139. Accordingly, as illustrated in FIG. 10, the movable plate 50 rotates around the third axis center X3 to displace a left end part thereof upward, and is moved from the first position illustrated in FIG. 5 and the like to the second position illustrated in FIG. 6 and the like.

On the other hand, when the second drive source M2 rotates the drive gear M2G counter-clockwise in FIG. 10 and the second electromagnetic clutch C2 is further in the connected state by the control of the controller 7, the third drive train 130 transmits the drive force from the second drive source M2 to the movable plate 50 by the operation of the gear 131, the gears 132A to 132D, the bevel gears 133 and 134, the worm 135, the worm wheel 136, the gear 137, and the fan shaped gear 139 in an opposite direction. Accordingly, as illustrated in FIG. 8, the movable plate 50 rotates around the third axis center X3 to displace the left end part thereof downward, and is moved from the second position illustrated in FIG. 6 and the like to the first position illustrated in FIG. 5 and the like.

<Configuration of First Drive Train>

As illustrated in FIGS. 7, 9, and 11, the automatic conveyance mechanism 4 includes the first drive train 110 for rotating the discharge unit 60 by transmitting the drive force from the first drive source M1 to the discharge unit 60. Further, in the embodiment, with respect to each gear forming the first drive train 110, illustration of gear teeth formed on the outer peripheral surface is omitted in FIGS. 7 and 9, and the like.

A plurality of arrows attached to the first drive train 110 in FIGS. 9 and 11 indicate a rotation direction when the drive gear M1G rotates counter-clockwise in FIGS. 9 and 11, and the first electromagnetic clutch C1 is in a connected state. Further, when the drive gear M1G rotates clockwise in FIGS. 9 and 11, the rotation direction becomes a rotation direction opposite to each arrow illustrated in FIGS. 9 and 11.

As illustrated in FIG. 7, the first drive train 110 is disposed forward further than the first side frame 9A and is supported by the plurality of shaft units, and the like protruding forward from the first side frame 9A.

As illustrated in FIGS. 7 and 9, the first drive train 110 includes a gear 111, the first electromagnetic clutch C1, a bevel gear 113, a bevel gear 114, a worm 115, a worm wheel 116, a gear 117, and a fan shaped gear 119.

The gear 111 is positioned leftward and downward with respect to the drive gear M1G and is engaged with the drive gear M1G The gear 111 is connected to an input side of the first electromagnetic clutch C1. The bevel gear 113 is connected to an output side of the first electromagnetic clutch C1.

The first electromagnetic clutch C1 includes the solenoid, which is not illustrated, and controlled and moved by the controller 7, and the clutch mechanism, which is not illustrated and switched between the connected state and the cut-off state by the action of the solenoid. A configuration of the clutch mechanism is the same as those of the electromagnetic clutch C2 and the electromagnetic clutch C3.

A rotation shaft 114S of the bevel gear 114 extends in the left and right direction orthogonal to a rotation shaft of the bevel gear 113. The bevel gear 114 is positioned rightward and forward with respect to the bevel gear 113 and is engaged with the bevel gear 113.

The worm 115 is fixed to the rotation shaft 114S extending to the right side from the bevel gear 114, and is rotatable integrally with the bevel gear 114. The worm wheel 116 and the gear 117 are formed as one member. Rotation shafts of the worm wheel 116 and the gear 117 extend in the front and rear direction in parallel with the second axis center X2. The worm wheel 116 is positioned below the worm 115 and is engaged with the worm 115. The gear 117 is disposed on a front side of the worm wheel 116 and has a diameter smaller than that of the worm wheel 116.

The fan shaped gear 119 is fixed to a front end of the shaft unit 61S in front of the discharge guide 61. The fan shaped gear 119 is positioned rightward with respect to the gear 117 and is engaged with the gear 117. When the fan shaped gear 119 rotates, the discharge unit 60 rotates integrally with the fan shaped gear 119.

Next, an operation of the first drive train 110 will be described. When the first electromagnetic clutch C1 is in the cut-off state, even though the discharge unit 60 attempts to fall down by an own weight thereof, a force at that time is transmitted to the worm 115 and the worm wheel 116, whereby the worm 115 and the worm wheel 116 are self-locked. Therefore, the discharge unit 60 that is connected to the first electromagnetic clutch C1 via the worm 115 and the worm wheel 116 does not fall down, and is maintained at the position.

When the first drive source M1 rotates the drive gear M1G counter-clockwise in FIG. 9 and the first electromagnetic clutch C1 is further in the connected state by the control of the controller 7, the first drive train 110 transmits the drive force from the first drive source M1 to the discharge unit 60 by the operation of the gear 111, the bevel gears 113 and 114, the worm 115, the worm wheel 116, the gear 117, and the fan shaped gear 119. Accordingly, as illustrated in FIG. 11, the discharge unit 60 rotates around the second axis center X2 to displace the discharge opening 69 upward, and moves to the fourth position illustrated in FIG. 6 and the like.

On the other hand, when the first drive source M1 rotates the drive gear M1G clockwise in FIG. 11 and the first electromagnetic clutch C1 is further in the connected state by the control of the controller 7, the first drive train 110 transmits the drive force from the first drive source M1 to the discharge unit 60 by the operation of the gear 111, the bevel gears 113 and 114, the worm 115, the worm wheel 116, the gear 117, and the fan shaped gear 119 in an opposite direction. Accordingly, as illustrated in FIG. 9, the discharge unit 60 rotates around the second axis center X2 to displace the discharge opening 69 downward, and moves to the third position illustrated in FIG. 5 and the like.

As illustrated in FIG. 5, when the movable plate 50 is in the first position, a left end part of the movable plate 50 is at a position opposite to a lower end part of the regulation surface 35K of the first chute member 35, and an inclination angle of an upper surface of the movable plate 50 is approximately the same as an inclination angle of an upper surface of the supply tray main body 92. In this state, the supply tray 91 can support the sheet SH with the maximum number of stacked sheets. When the movable plate 50 is at the first position and the supply roller 41 abuts on the uppermost sheet SH of the maximum number of stacked sheets SH, the posture of the holder 42F becomes the appropriate posture illustrated in FIG. 5.

As illustrated in FIG. 6, when the movable plate 50 is in the second position, the left end part of the movable plate 50 is at a position opposite to the upper end part of the regulation surface 35K of the first chute member 35, and the upper surface of the movable plate 50 is in a state of being extended approximately horizontally at the same height as the conveyance surface 35G of the first chute member 35. In this state, the supply tray 91 supports about one to several number of the sheets SH. When the movable plate 50 is at the second position and the supply roller 41 abuts on the uppermost sheet SH of the one to several number of the sheets SH, the posture of the holder 42F becomes the appropriate posture illustrated in FIG. 6.

When it is determined that the posture of the holder 42F is in a state of descending beyond an allowable range from the appropriate posture illustrated in FIGS. 5 and 6 based on a detection signal of the holder posture detection sensor 42J, the controller 7 operates the second drive source M2 and the third drive train 130. Then, the controller 7 rotates the movable plate 50 little by little from the first position illustrated in FIG. 5 and the like to the second position illustrated in FIG. 6 and the like, whereby the holder 42F is controlled to maintain the appropriate posture illustrated in FIGS. 5 and 6. At this time, it is possible to determine a position of the movable plate 50 in a desired rotation posture with high accuracy by finely changing a rotation posture of the fan shaped gear 139 by rotation angle control of the second drive source M2 which is the stepping motor.

The controller 7 appropriately operates the first drive source M1 and the first drive train 110 according to the small rotation of the movable plate 50, and then rotates the discharge unit 60 little by little from the third position illustrated in FIG. 5 and the like toward the fourth position illustrated in FIG. 6 and the like.

The image reading device 1 achieves miniaturization in the up and down direction by a configuration in which the discharge unit 60 rotates according to the rotation of the movable plate 50 of the supply tray 91.

As illustrated in FIG. 5, when the discharge unit 60 is in the third position, the discharge opening 69, the discharge roller 47, and the discharge pinch roller 48 are at positions close to the sheet supporting surface 96A of the discharge tray 96. A state of the discharge unit 60 corresponds to a case in which the number of sheets SH supported by the sheet supporting surface 96A of the discharge tray 96 is small.

As illustrated in FIG. 6, when the discharge unit 60 is in the fourth position, the discharge opening 69, the discharge roller 47, and the discharge pinch roller 48 are at positions separated upward from the sheet supporting surface 96A of the discharge tray 96. A state of the discharge unit 60 corresponds to a case in which the sheet SH is supported by the sheet supporting surface 96A of the discharge tray 96 with the maximum number of stacked sheets. In other words, in this state, the discharge opening 69 of the discharge unit 60 is sufficiently separated upward from the uppermost sheet SH of the sheets SH supported by the sheet supporting surface 96A with the maximum number of stacked sheets.

<Image Reading Operation>

In the image reading device 1, when reading an image on a document supported by the document supporting surface 8A, the controller 7 operates the scanning mechanism, which is not illustrated, by controlling the scanning mechanism drive source 3M of the reading unit 3, and then moves the reading sensor 3S in the left and right direction from a reading start position below a left end edge of the document supporting surface 8A to a reading end position below a right end edge thereof. Accordingly, the reading sensor 3S reads the image on the document supported by the document supporting surface 8A. Thereafter, the controller 7 operates the scanning mechanism, which is not illustrated, in a reverse direction by controlling the scanning mechanism drive source 3M of the reading unit 3, and then moves the reading sensor 3S which completes the reading from a right end to a left end in the reading unit 3, thereby returning the reading sensor 3S to a standby position.

Further, in the image reading device 1, the sheet SH supported by the supply tray 91 is conveyed by the automatic conveyance mechanism 4; when reading the image on the sheet SH, the controller 7 operates the scanning mechanism, which is not illustrated, by controlling the scanning mechanism drive source 3M of the reading unit 3; and the reading sensor 3S is stopped at the stationary reading position below the reading surface 8B. Here, it is assumed that the movable plate 50 is at the first position illustrated in FIG. 5, and the like, the discharge unit 60 is at the third position illustrated in FIG. 5, and the like, and the sheet SH is in a state of not being supported by the discharge tray 96.

Next, the controller 7 determines whether or not the holder posture detection sensor 42J is in the appropriate posture illustrated in FIGS. 5 and 6 based on the detection signal of the holder posture detection sensor 42J. When the holder posture detection sensor 42J is not in the appropriate posture illustrated in FIGS. 5 and 6, the controller 7 operates the second drive source M2 and the third drive train 130. Next, the controller 7 rotates the movable plate 50 little by little from the first position illustrated in FIG. 5 and the like toward the second position illustrated in FIG. 6 and the like, and controls the holder 42F to maintain the appropriate posture illustrated in FIGS. 5 and 6.

Further, the controller 7 appropriately operates the first drive source M1 and the first drive train 110 according to the small rotation of the movable plate 50, and then rotates the discharge unit 60 little by little from the third position illustrated in FIG. 5 and the like toward the fourth position illustrated in FIG. 6 and the like.

Next, the controller 7 operates the first drive source M1 and the second drive train 120, and the second drive source M2 and the fourth drive train 140. Accordingly, the controller 7 drives the supply roller 41, the separation roller 42, the first conveyance roller 43, the second conveyance roller 44, and the discharge roller 47, and then supplies the sheet SH supported by the supply tray 91 to the conveyance guide 30 to sequentially convey the supplied sheet SH along the conveyance guide 30. When the conveyed sheet SH passes over the reading surface 8B, the controller 7 reads the image on the conveyed sheet SH by the reading sensor 3S stopped at the stationary reading position. Next, the controller 7 discharges the sheet SH whose image is read out through the discharge opening 69 toward the discharge tray 96 by the discharge guide 61, the discharge roller 47, and the discharge pinch roller 48 of the discharge unit 60.

Meanwhile, the controller 7 operates the third drive train 130 according to the decrease of the sheets SH supported by the supply tray 91 based on the detection signal of the holder posture detection sensor 42J, thereby rotating the movable plate 50 little by little toward the second position illustrated in FIG. 6 and the like. Further, the controller 7 appropriately operates the first drive train 110 according to the small rotation of the movable plate 50, thereby rotating the discharge unit 60 little by little toward the fourth position illustrated in FIG. 6 and the like.

As illustrated in FIG. 6, when the number of sheets SH supported by the supply tray 91 decreases and further the sheet SH runs out, the controller 7 stops the first drive source M1 and the second drive source M2, thereby terminating the image reading operation.

Thereafter, the controller 7 operates the scanning mechanism, which is not illustrated, by controlling the scanning mechanism drive source 3M of the reading unit 3, and then returns the reading sensor 3S to the standby position. Further, after a detection means which is not illustrated confirms that the sheet SH is not supported by the discharge tray 96, the controller 7 operates the second drive source M2 and the third drive train 130 and then returns the movable plate 50 to the first position illustrated in FIG. 5 and the like, and further the controller 7 operates the first drive source M1 and the first drive train 110 and then returns the discharge unit 60 to the third position illustrated in FIG. 5 and the like.

<Operational Effect>

In the image reading device 1 of the first embodiment, the number of components can be reduced by performing the drive for rotating the discharge guide 61 and the rotation drive of the discharge roller 47 by the first drive source M1. Specifically, the drive source can be reduced as compared with a case in which the drive source for rotating the discharge guide 61 and the drive source for performing the rotation drive of the discharge roller 47 are separately provided. Further, with respect to drive components for rotating the discharge guide 61 and drive components for rotating the discharge roller 47, some components such as the drive gear M1G and the like can be shared.

Therefore, in the image reading device 1 of the first embodiment, it is possible to achieve reduction of manufacturing cost.

Further, in the image reading device 1, as illustrated in FIGS. 7 and 9, and the like, it is possible not only to surely perform the rotation of the discharge guide 61 by the first drive source M1 and the first drive train 110, but also to surely perform the rotation of the discharge roller 47 by the first drive source M1 and the second drive train 120.

Further, in the image reading device 1, as illustrated in FIGS. 9 and 11, when the discharge guide 61 is rotated by the first drive train 110, the second drive train 120 transmits the drive force from the first drive source M1 to the discharge roller 47, thereby enabling to allow the discharge roller 47 to discharge the sheet SH through the discharge opening 69. Accordingly, in the image reading device 1, it is possible to increase chances of performing the discharge operation of the sheet SH in comparison with a configuration in which the discharge operation of the sheet SH by the discharge roller 47 cannot be performed when the discharge guide 61 rotates. As a result, improvement of a processing speed including the discharge operation of the sheet SH by the discharge roller 47 and the rotation operation of the discharge guide 61 can be achieved, and further the time required for the image reading operation can be shortened.

Further, in the image reading device 1, as illustrated in FIG. 7, the drive force from the first drive source M1 is transmitted to the discharge guide 61 and the discharge roller 47 which are a side of discharging the sheet SH, whereby the rotation of the discharge guide 61 and the rotation drive of the discharge roller 47 are performed. Further, the drive force from the second drive source M2 is transmitted to the movable plate 50, the supply roller 41, the separation roller 42, the first conveyance roller 43, and the second conveyance roller 44 which are a side of supplying the sheet SH, whereby the rotation of the movable plate 50, and the rotation drive of the supply roller 41, the separation roller 42, the first conveyance roller 43 and the second conveyance roller 44 are performed. As a result, the first drive source M1 and the second drive source M2 are divided into the side of discharging the sheet SH and the side of supplying the sheet SH, thereby enabling to appropriately perform the respective roles.

Further, in the image reading device 1, as illustrated in FIGS. 7 and 9, and the like, a degree of freedom of a rotation timing of the discharge guide 61 can be improved by disconnecting the first electromagnetic clutch C1 in the process of operating the first drive source M1. Further, as illustrated in FIGS. 7 and 8, and the like, a degree of freedom of a rotation timing of the movable plate 50 can be improved by disconnecting the second electromagnetic clutch C2 in the process of operating the second drive source M2.

Further, in the image reading device 1, the automatic conveyance mechanism 4 includes the discharge unit 60 in which the discharge guide 61, the discharge roller 47, and the discharge pinch roller 48 are unitized. Accordingly, even though the discharge guide 61 rotates, a relative positional relationship between the discharge guide 61, and the discharge roller 47 and the discharge pinch roller 48 is constant. Additionally, a relative positional relationship between the first axis center X1 and the second axis center X2 is constant. Therefore, when the discharge guide 61 stops and when the discharge guide 61 rotates, the pulley 123 can appropriately transmit the drive force from the first drive source M1 to the pulley 125, whereby the discharge roller 47 and the discharge pinch roller 48 can appropriately discharge the sheet SH through the discharge opening 69.

Second Embodiment

Figure 12:
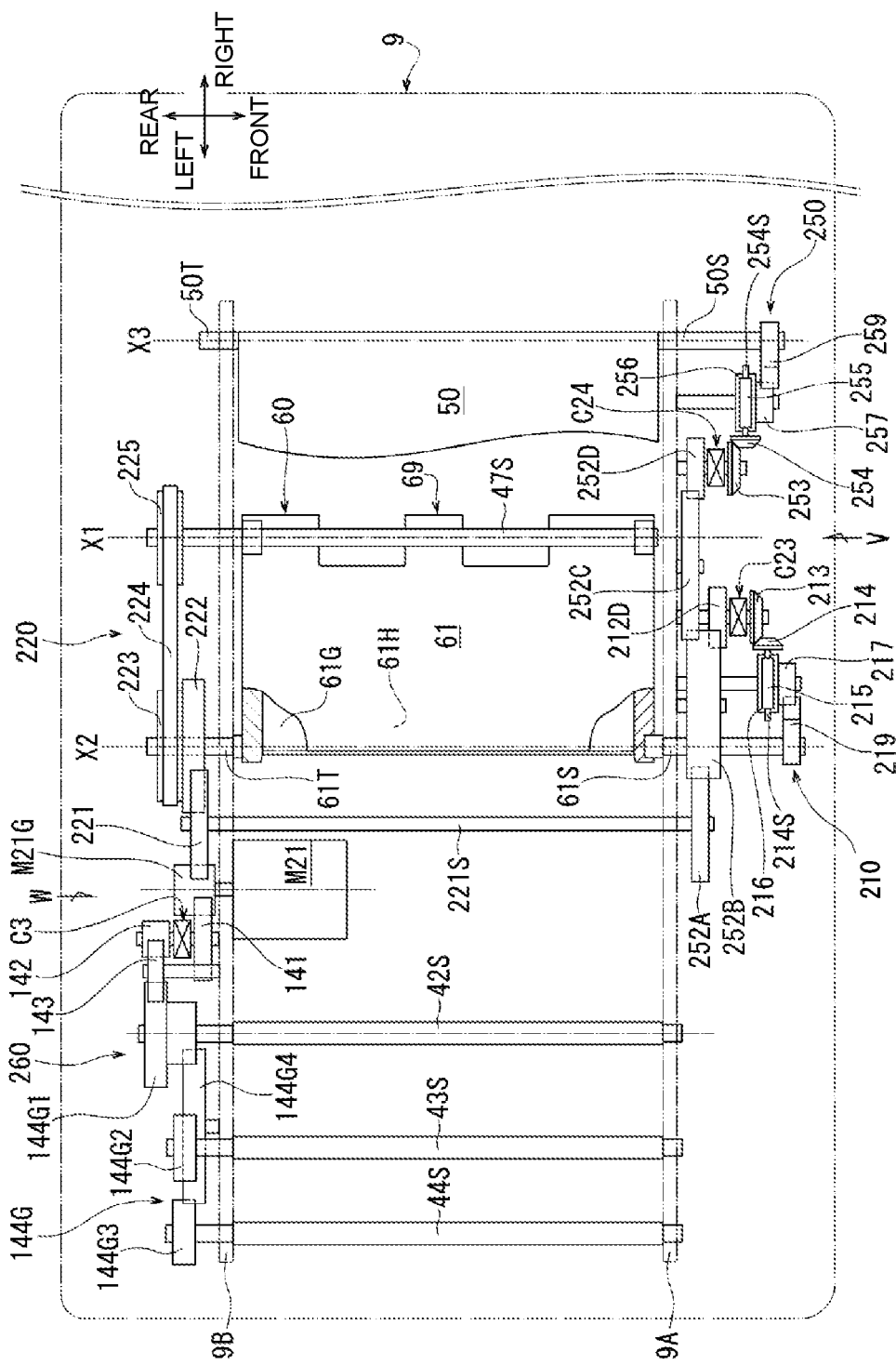
FIG. 12 is a schematic top view illustrating an image reading device according a second embodiment.

As illustrated in FIGS. 12 to 15, the image reading device of a second embodiment adopts a first drive source M21 instead of the first drive source M1 and the second drive source M2 according to the image reading device 1 of the first embodiment. Further, in the image reading device, a first drive train 210, a second drive train 220, a fifth drive train 250, and a sixth drive train 260 are adopted instead of the first drive train 110, the second drive train 120, the third drive train 130, and the fourth drive train 140 according to the image reading device 1 of the first embodiment. Further, as illustrated in FIG. 12, in the image reading device, the shaft unit 61T on a rear side of the discharge guide 61 is changed to protrude rearward lengthily; the rear end part of the rotation unit 47S of the discharge roller 47 is changed to protrude rearward lengthily; and the shaft unit 50S in front of the movable plate 50 is changed to protrude forward lengthily. Other configurations of the second embodiment are the same as those of the first embodiment. Therefore, the same reference signs are denoted to the same configurations as those of the first embodiment, and the descriptions thereof will be omitted or simplified.

<Configuration of First Drive Source>

As illustrated in FIG. 12, the first drive source M21 is disposed at the same position as the installation position of the second drive source M2 according to the first embodiment. That is, the first drive source M21 is mounted on the surface facing the front side of the second side frame 9B. A drive shaft of the first drive source M21 protrudes rearward further than the second side frame 9B, and a drive gear M21G is fixed to the drive shaft thereof. In the embodiment, the first drive source M21 is a stepping motor. The first drive source M21 generates a drive force by being controlled by the controller 7, thereby rotating the drive gear M21G clockwise and counter-clockwise in FIG. 13.

<Configuration of Sixth Drive Train>

Figure 13:
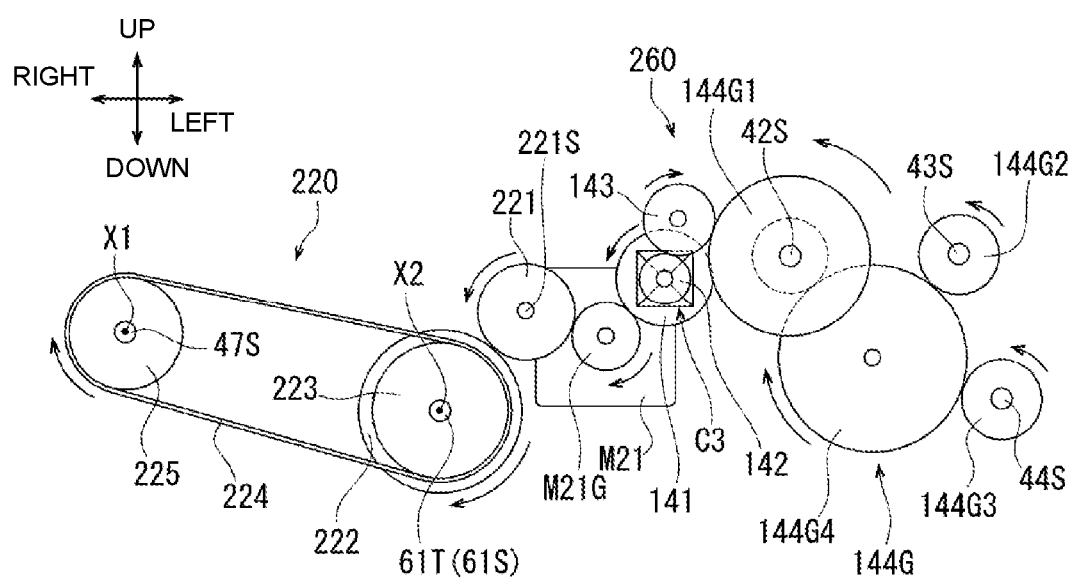
FIG. 13 is a schematic diagram illustrating a first drive source, a second drive train, a sixth drive train, and the like when viewed from an arrow W direction in FIG. 12.

As illustrated in FIGS. 12 and 13, the sixth drive train 260 has the same configurations as those of the forth drive train 140 according to the first embodiment except that the gear 141 of the fourth drive train 140 according to the first embodiment is changed to be engaged with the drive gear M21G of the first drive source M21.

The sixth drive train 260 transmits a drive force from the first drive source M21 to the rotation shaft 42S of the separation roller 42, the rotation shaft 43S of the first conveyance roller 43, and the rotation shaft 44S of the second conveyance roller 44 by the gear 141, the electromagnetic clutch C3, the gear 142, the gear 143, and the plurality of gear groups 144G and rotates the separation roller 42, the first conveyance roller 43, and the second conveyance roller 44 in a direction in which the sheet SH is conveyed toward the reading sensor 3S stopped at the stationary reading position, that is, counter-clockwise in FIG. 13.

<Configuration of Second Drive Train>

As illustrated in FIG. 12, the second drive train 220 is disposed rearward further than the second side frame 9B and is supported by the plurality of shaft units protruding rearward from the second side frame 9B.

Further, in the embodiment, with respect to each gear forming the second drive train 220, illustration of gear teeth formed on the outer peripheral surface is omitted in FIGS. 12 and 13. A plurality of arrows attached to the second drive train 220 in FIG. 13 indicate a rotation direction when the drive gear M21G rotates clockwise in FIG. 13.

As illustrated in FIGS. 12 and 13, the second drive train 220 includes a transmission shaft 221S, a gear 221, a gear 222, a pulley 223, a timing belt 224, and a pulley 225.

The transmission shaft 221S extends in the front and rear direction and is rotatably supported by the first side frame 9A and the second side frame 9B. A front end part of the transmission shaft 221S protrudes forward further than the first side frame 9A. A rear end part of the transmission shaft 221S protrudes rearward further than the second side frame 9B.

The gear 221 is fixed to the rear end part of the transmission shaft 221S. The gear 221 is positioned rightward with respect to the drive gear M21G and is engaged with the drive gear M21G. The gear 222 is positioned rightward and downward with respect to the gear 221 and is engaged with the gear 221. The gear 222 and the pulley 223 are formed as one member. The pulley 223 is disposed on the rear side of the gear 222. The gear 222 and the pulley 223 are inserted into the shaft unit 61T on the rear side of the discharge guide 61 to be rotatable independently. The pulley 223 is rotatable around the second axis center X2 integrally with the gear 222.

The pulley 225 is fixed to the rear end part of the rotation shaft 47S of the discharge roller 47. The pulley 225 is rotatable around the first axis center X1 together with the rotation shaft 47S of the discharge roller 47. The timing belt 224 is wound around the pulley 223 and the pulley 225. The timing belt 224 transmits the drive force from the first drive source M21 from the pulley 223 to the pulley 225.

When the first drive source M21 rotates the drive gear M21G clockwise in FIG. 13, the gears 221 and 222, the pulley 223, the timing belt 224, and the pulley 225 transmit the drive force from the first drive source M21 to the rotation shaft 47S of the discharge roller 47, whereby the discharge roller 47 rotates in a direction in which the sheet SH is discharged through the discharge opening 69 to the discharge tray 96, that is, clockwise in FIG. 13. When the discharge guide 61 stops and when the discharge guide 61 rotates, the second drive train 220 transmits the drive force from the first drive source M21 to the discharge roller 47, thereby enabling to allow the discharge roller 47 to discharge the sheet SH through the discharge opening 69.

<Configuration of Fifth Drive Train>

Figure 14:
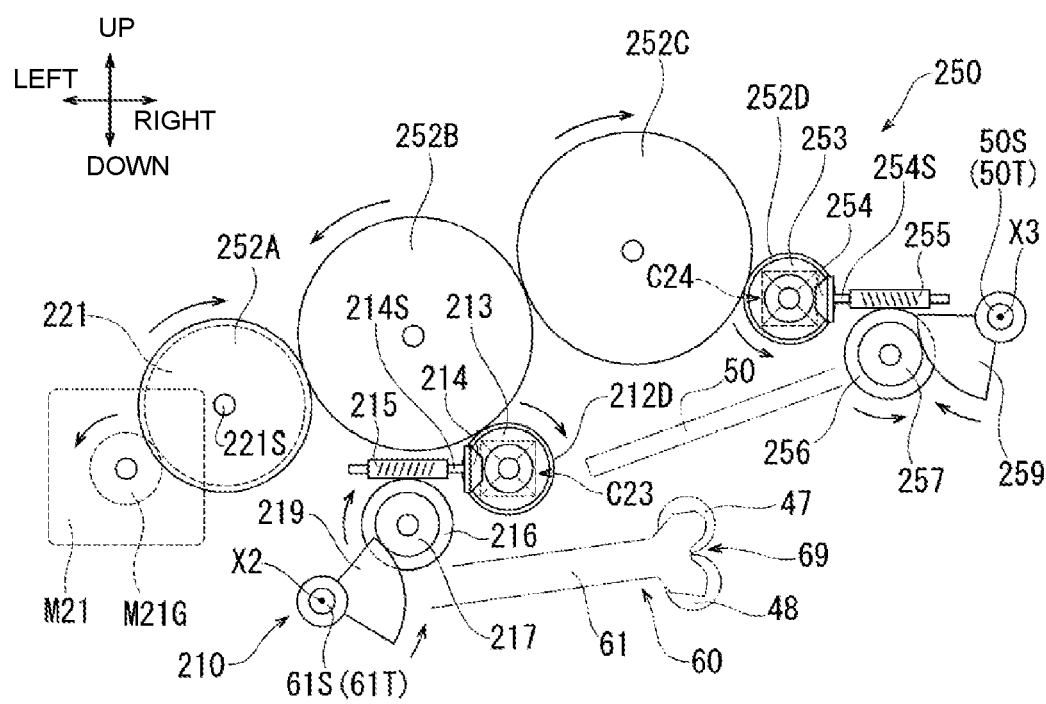
FIG. 14 is a schematic diagram illustrating a movable plate, a discharge unit, a first drive source, a first drive train, a fifth drive train, and the like when viewed from an arrow V direction in FIG. 12, and is a diagram illustrating a state in which the movable plate is disposed at a first position and the discharge unit is disposed at a third position.
Figure 15:
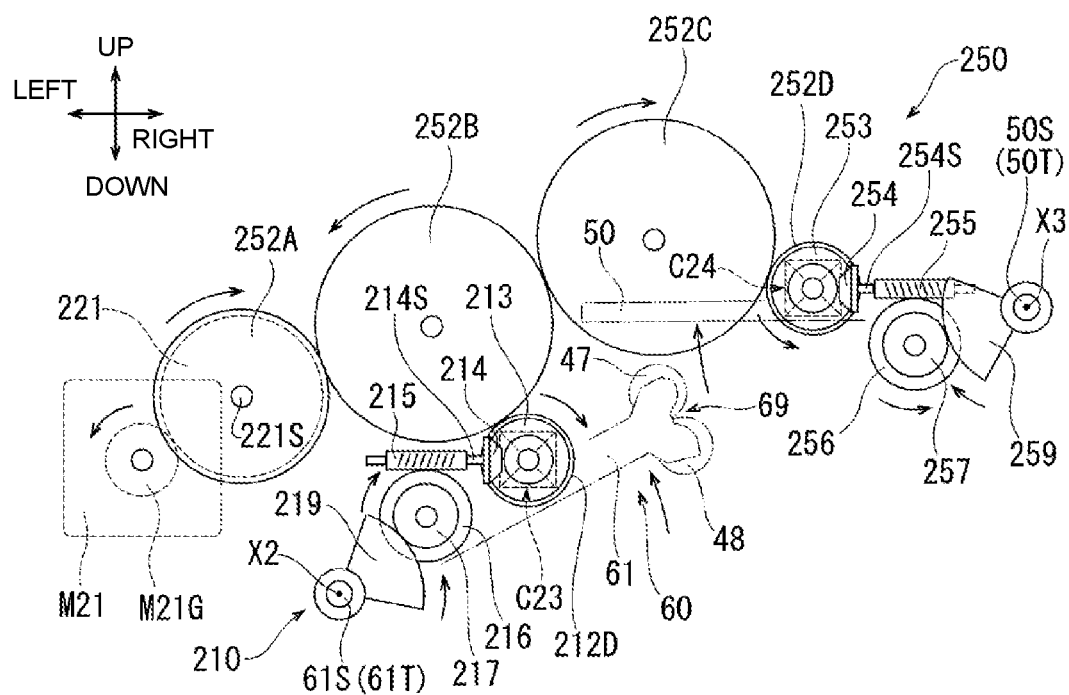
FIG. 15 is a schematic diagram same as that of FIG. 14, and is a diagram illustrating a state in which the movable plate is moved to a second position and the discharge unit is moved to a fourth position.

As illustrated in FIGS. 12, 14, and 15, the fifth drive train 250 shares the above-mentioned gear 221 and the transmission shaft 221S with the second drive train 220. As illustrated in FIG. 12, components other than the gear 221 and the transmission shaft 221S in the fifth drive train 250 are disposed forward further than the first side frame 9A and are supported by the plurality of shaft units, and the like protruding in a forward direction from the first side frame 9A. In the embodiment, with respect to each gear forming the fifth drive train 250, illustration of gear teeth formed on the outer peripheral surface is omitted in FIGS. 12 and 14, and the like.

A plurality of arrows attached to the fifth drive train 250 in FIGS. 14 and 15 indicate a rotation direction when the drive gear M21G rotates counter-clockwise in FIGS. 14 and 15, and a fourth electromagnetic clutch C24 is in a connected state. Further, when the drive gear M21G rotates clockwise in FIGS. 14 and 15, the rotation direction becomes a rotation direction opposite to each arrow illustrated in FIGS. 14 and 15.

As illustrated in FIGS. 12 and 14, the fifth drive train 250 includes a gear 252A, a gear 252B, a gear 252C, a gear 252D, the fourth electromagnetic clutch C24, a bevel gear 253, a bevel gear 254, a worm 255, a worm wheel 256, a gear 257, and a fan shaped gear 259 as well as the above-mentioned gear 221 and transmission shaft 221S.

The gear 252A is fixed to the front end part of the transmission shaft 221S and is rotatable integrally with the gear 221. The gear 252B is positioned rightward and upward with respect to the gear 252A and is engaged with the gear 252A. The gear 252C is positioned rightward and upward with respect to the gear 252B and is engaged with the gear 252B. The gear 252D is positioned rightward and downward with respect to the gear 252C and is engaged with the gear 252C. The gear 252D is connected to an input side of the fourth electromagnetic clutch C24. The bevel gear 253 is connected to an output side of the fourth electromagnetic clutch C24. A configuration of the fourth electromagnetic clutch C24 is the same as those of the first electromagnetic clutch C1, and the like according to the first embodiment.

A rotation shaft 254S of the bevel gear 254 extends in the left and right direction orthogonal to a rotation shaft of the bevel gear 253. The bevel gear 254 is positioned rightward and forward with respect to the bevel gear 253 and is engaged with the bevel gear 253.

The worm 255 is fixed to the rotation shaft 254S extending to the right side from the bevel gear 254, and is rotatable integrally with the bevel gear 254. The worm wheel 256 and the gear 257 are formed as one member. Rotation shafts of the worm wheel 256 and the gear 257 extend in the front and rear direction in parallel with the third axis center X3. The worm wheel 256 is positioned below the worm 255 and is engaged with the worm 255. The gear 257 is disposed on a front side of the worm wheel 256 and has a diameter smaller than that of the worm wheel 256.

The fan shaped gear 259 is fixed to the shaft unit 50S in front of the movable plate 50. The fan shaped gear 259 is positioned rightward with respect to the gear 257 and is engaged with the gear 257. When the fan shaped gear 259 rotates, the movable plate 50 rotates integrally with the fan shaped gear 259.

Next, an operation of the fifth drive train 250 will be described. When the fourth electromagnetic clutch C24 is in the cut-off state, even though the movable plate 50 attempts to fall down by an own weight thereof, a force at that time is transmitted to the worm 255 and the worm wheel 256, whereby the worm 255 and the worm wheel 256 are self-locked. Therefore, the movable plate 50 that is connected to the fourth electromagnetic clutch C24 via the worm 255 and the worm wheel 256 does not fall down, and is maintained at the position.

When the first drive source M21 rotates the drive gear M21G counter-clockwise in FIG. 14 and the fourth electromagnetic clutch C24 is further in the connected state by the control of the controller 7, the fifth drive train 250 transmits the drive force from the first drive source M21 to the movable plate 50 by the operation of the gear 221, the transmission shaft 221S, the gears 252A to 252D, the bevel gears 253 and 254, the worm 255, the worm wheel 256, the gear 257, and the fan shaped gear 259. Accordingly, as illustrated in FIG. 15, the movable plate 50 rotates around the third axis center X3 to displace a left end part thereof upward, and moves from the first position illustrated in FIG. 5 and the like to the second position illustrated in FIG. 6 and the like.

On the other hand, when the first drive source M21 rotates the drive gear M21G clockwise in FIG. 15 and the fourth electromagnetic clutch C24 is further in the connected state by the control of the controller 7, the fifth drive train 250 transmits the drive force from the first drive source M21 to the movable plate 50 by the operation of the gear 221, the transmission shaft 221S, the gears 252A to 252D, the bevel gears 253 and 254, the worm 255, the worm wheel 256, the gear 257, and the fan shaped gear 259 in an opposite direction. Accordingly, as illustrated in FIG. 14, the movable plate 50 rotates around the third axis center X3 to displace the left end part thereof downward, and moves from the second position illustrated in FIG. 6 and the like to the first position illustrated in FIG. 5 and the like.

<Configuration of First Drive Train>

As illustrated in FIGS. 12, 14, and 15, the first drive train 210 shares the above-mentioned gear 221 and the transmission shaft 221S with the second drive train 220 and the fifth drive train 250. Further, the first drive train 210 shares the gears 252A and 252B with the fifth drive train 250. As illustrated in FIG. 12, components other than the gear 221 and the transmission shaft 221S in the first drive train 210 are disposed forward further than the first side frame 9A and are supported by the plurality of shaft units, and the like protruding in a forward direction from the first side frame 9A. Further, in the embodiment, with respect to each gear forming the first drive train 210, illustration of gear teeth formed on the outer peripheral surface is omitted in FIGS. 12 and 14.

A plurality of arrows attached to the first drive train 210 in FIGS. 14 and 15 indicate a rotation direction when the drive gear M21G rotates counter-clockwise in FIGS. 14 and 15, and a third electromagnetic clutch C23 is in a connected state. Further, when the drive gear M21G rotates clockwise in FIGS. 14 and 15, the rotation direction becomes a rotation direction opposite to each arrow illustrated in FIGS. 14 and 15.

As illustrated in FIGS. 12 and 14, the first drive train 210 includes a gear 212D, the third electromagnetic clutch C23, a bevel gear 213, a bevel gear 214, a worm 215, a worm wheel 216, a gear 217, and a fan shaped gear 219 as well as the gear 221, the transmission shaft 221S, and the gears 252A and 252B.

The gear 212D is positioned rightward and downward with respect to the gear 252B and is engaged with the gear 252B. The gear 212D is connected to an input side of the third electromagnetic clutch C23. The bevel gear 213 is connected to an output side of the third electromagnetic clutch C23. A configuration of the third electromagnetic clutch C23 is the same as those of the first electromagnetic clutch C1, and the like according to the first embodiment.

A rotation shaft 214S of the bevel gear 214 extends in the left and right direction orthogonal to a rotation shaft of the bevel gear 213. The bevel gear 214 is positioned leftward and forward with respect to the bevel gear 213 and is engaged with the bevel gear 213.

The worm 215 is fixed to the rotation shaft 214S extending to the left side from the bevel gear 214, and is rotatable integrally with the bevel gear 214. The worm wheel 216 and the gear 217 are formed as one member. Rotation shafts of the worm wheel 216 and the gear 217 extend in the front and rear direction in parallel with the second axis center X2. The worm wheel 216 is positioned below the worm 215 and is engaged with the worm 215. The gear 217 is disposed on a front side of the worm wheel 216 and has a diameter smaller than that of the worm wheel 216.

The fan shaped gear 219 is fixed to the shaft unit 61S in front of the discharge gear 60. The fan shaped gear 219 is positioned leftward and downward with respect to the gear 217 and is engaged with the gear 217. When the fan shaped gear 219 rotates, the discharge gear 60 rotates integrally with the fan shaped gear 219.

Next, an operation of the first drive train 210 will be described. When the third electromagnetic clutch C23 is in the cut-off state, even though the discharge unit 60 attempts to fall down by an own weight thereof, a force at that time is transmitted to the worm 215 and the worm wheel 216, whereby the worm 215 and the worm wheel 216 are self-locked. Therefore, the discharge unit 60 that is connected to the third electromagnetic clutch C23 via the worm 215 and the worm wheel 216 does not fall down, and is maintained at the position.

When the first drive source M21 rotates the drive gear M21G counter-clockwise in FIG. 14 and the third electromagnetic clutch C23 is further in the connected state by the control of the controller 7, the first drive train 210 transmits the drive force from the first drive source M21 to the discharge unit 60 by the operation of the gear 221, the transmission shaft 221S, the gears 252A and 252B, the gear 212D, the bevel gears 213 and 214, the worm 215, the worm wheel 216, the gear 217, and the fan shaped gear 219. Accordingly, as illustrated in FIG. 15, the discharge unit 60 rotates around the second axis center X2 to displace the discharge opening 69 upward, and moves to the fourth position illustrated in FIG. 6 and the like.

On the other hand, when the first drive source M21 rotates the drive gear M21G clockwise in FIG. 15 and the third electromagnetic clutch C23 is further in the connected state by the control of the controller 7, the first drive train 210 transmits the drive force from the first drive source M21 to the discharge unit 60 by the operation of the gear 221, the transmission shaft 221S, the gears 252A and 252B, the gear 212D, the bevel gears 213 and 214, the worm 215, the worm wheel 216, the gear 217, and the fan shaped gear 219 in an opposite direction. Accordingly, as illustrated in FIG. 14, the discharge unit 60 rotates around the second axis center X2 to displace the discharge opening 69 downward, and moves to the third position illustrated in FIG. 5 and the like.

<Operational Effect>

In the image reading device of the second embodiment, the number of components can be reduced by performing the drive for rotating the discharge guide 61 and the rotation drive of the discharge roller 47 by the first drive source M21. Specifically, the drive source can be reduced, and further, with respect to the drive components for rotating the discharge guide 61 and the drive components for rotating the discharge roller 47, some components such as the drive gear M21G; the gear 221, the transmission shaft 221S, and the like can be shared.

Therefore, in the image reading device of the second embodiment, in the same manner as that of the image reading device 1 of the first embodiment, it is possible to achieve the reduction of manufacturing cost.

Further, in the image reading device, as illustrated in FIG. 13, when the discharge guide 61 is rotated by the first drive train 210, the second drive train 220 transmits the drive force from the first drive source M21 to the discharge roller 47, thereby enabling to allow the discharge roller 47 to discharge the sheet SH through the discharge opening 69. Accordingly, in the image reading device, in the same manner as that of the image reading device 1 of the first embodiment, the improvement of the processing speed including the discharge operation of the sheet SH by the discharge roller 47 and the rotation operation of the discharge guide 61 can be achieved, and further the time required for the image reading operation can be shortened.

Further, in the image reading device, as illustrated in FIG. 12, it is possible to perform the drive for rotating the discharge guide 61, the rotation drive of the discharge roller 47, the drive for rotating the movable plate 50, and the rotation drive of the supply roller 41, the separation roller 42, the first conveyance roller 43 and the second conveyance roller 44 by the single first drive source M21. As a result, the manufacturing cost can be further reduced.

Further, in the image reading device, as illustrated in FIGS. 14 and 15, a degree of freedom of a rotation timing of the discharge guide 61 can be improved by disconnecting the third electromagnetic clutch C23 in the process of operating the first drive source M21. Further, a degree of freedom of a rotation timing of the movable plate 50 can be improved by disconnecting the fourth electromagnetic clutch C24 in the process of operating the first drive source M21.

As described above, the present disclosure is described according to the first and second embodiments, but the present disclosure is not limited to the first and second embodiments, and it goes without saying that the present disclosure can be applied by being appropriately modified within the scope not deviated from the gist thereof.

MODIFIED EXAMPLE

In the second embodiment, the third electromagnetic clutch C23 is provided in the first drive train 210, and the fourth electromagnetic clutch C24 is provided in the fifth drive train 250, but the present disclosure is not limited to this configuration. For example, the first drive train 210 and the fifth drive train 250 may share one electromagnetic clutch. Specifically, the gear 212D and the bevel gear 213 are directly connected to each other by replacing the third electromagnetic clutch C23 according to the second embodiment with a connecting shaft. Further, the gear 252D and the bevel gear 253 are directly connected to each other by replacing the fourth electromagnetic clutch C24 according to the second embodiment with a connecting shaft. Next, the electromagnetic clutch is provided between a front end part of the gear transmission shaft 221S and the gear 252A, and the discharge guide 61 and the movable plate 50 are rotated at the same timing by disconnecting the electromagnetic clutch. Even in such an image reading device of the modified example, the manufacturing cost can be reduced in the same manner as that of the image reading device 1 of the first and second embodiments.

<Modified Example of First Drive Train and Second Drive Train>

Figure 16:
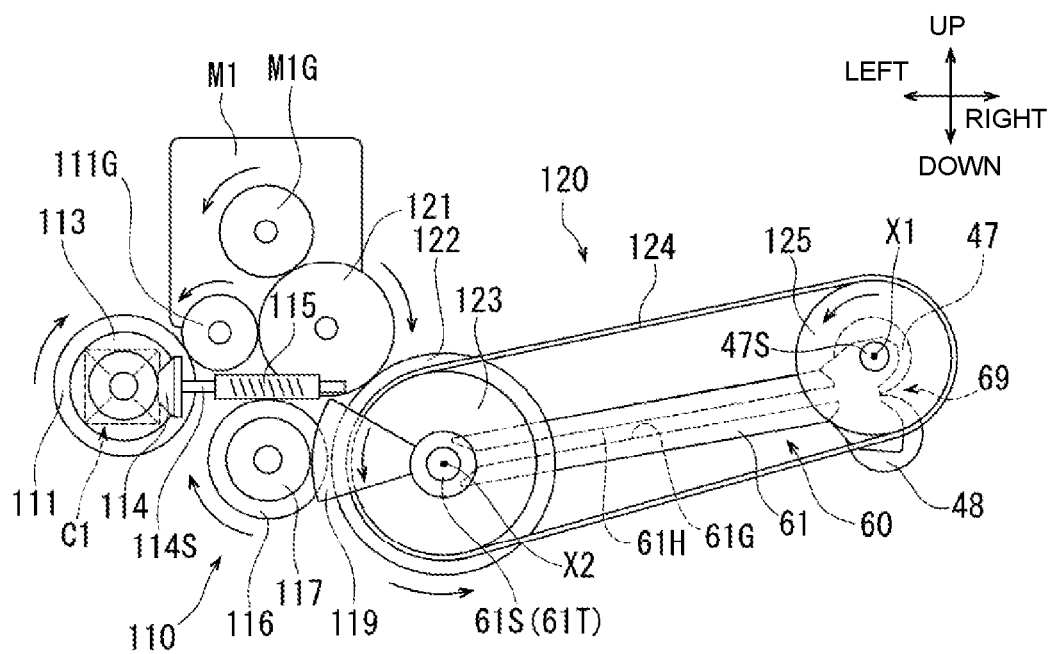
FIG. 16 is a schematic diagram same as that of FIG. 9, and is a diagram illustrating a modified example of the first drive train and the second drive train.

As illustrated in FIG. 9 and the like, in the first embodiment, the rotation drive of the discharge roller 47 and the rotation drive of the discharge unit 60 are realized by a configuration in which the first drive train 110 and the second drive train 120 are connected to the drive gear M1G of the first drive source M1 in parallel, but the present disclosure is not limited to this configuration. For example, the rotation drive of the discharge roller 47 and the rotation drive of the discharge unit 60 may be realized by a configuration including a portion in which the first drive train 110 and the second drive train 120 are connected to each other in series. FIG. 16 illustrates a specific example. Changes with respect to first embodiment illustrated in FIG. 16 are as follows. A position where the drive gear M1G of the first drive source M1 is engaged with the gear 121 of the second drive train 120 is deviated rightward and upward, so that the drive gear M1G thereof is changed to be separated from the gear 111 of the first drive train 110. Further, the gear 111G is disposed between the gear 111 of the first drive train 110 and the gear 121 of the second drive train 120. Accordingly, the drive force from the first drive source M1 is transmitted to the gear 111 of the first drive train 110 via the drive gear M1G the gear 121 of the second drive train 120, and the gear 111G. That is, in the example illustrated in FIG. 16, the first drive train 110 is connected to a part of the second drive train 120 in series.

In the first and second embodiments, the movable plate 50 is configured to rotate, but is not limited to this configuration, and for example, the movable plate 50 may be linearly moved. The same also applies to the discharge unit.

INDUSTRIAL APPLICABILITY

For example, the configuration according to the present disclosure may be implemented in an image reading device or a multifunction machine, and the like.

ADVANTAGEOUS EFFECTS

In the image reading device of the present disclosure, the number of components can be reduced by performing the drive for moving the discharge guide and the rotation drive of the discharge roller by the first drive source. Specifically, the drive sources can be reduced. Further, with respect to the drive components for moving the discharge guide and the drive components for rotating the discharge roller, some components such as a gear, a transmission shaft, and the like can be shared.

Therefore, in the image reading device of the present disclosure, it is possible to achieve the reduction of the manufacturing cost.

What is claimed is:

1. An image reading device comprising:
   a supply tray configured to supply a sheet to be supplied, the supply tray including a movable plate that is configured to move from a first position to a second position according to a decrease in the number of the sheet to be supported by the supply tray, the second position being higher than the first position;
   a discharge tray positioned below the supply tray, the discharge tray being configured to support the sheet to be discharged;
   a conveyance guide configured to convey the sheet from the supply tray to the discharge tray;
   a reading sensor configured to read an image on the sheet to be conveyed on the conveyance guide;
   a discharge guide including a discharge opening for discharging the sheet conveyed by the conveyance guide to the discharge tray, the discharge guide being configured to rotate around a second axis center and move from a third position to a fourth position according to the decrease in the number of the sheet to be supported by the supply tray, the fourth position being higher than the third position;
   a discharge roller configured to rotate around a first axis center and to discharge the sheet through the discharge opening;
   a first drive source configured to generate a first drive force;
   a first drive train configured to transmit the first drive force from the first drive source to the discharge guide to move the discharge guide between the third position and the fourth position; and
   a second drive train configured to transmit the first drive force from the first drive source to the discharge roller to rotate the discharge roller, the second drive train including:
      a rotatable element configured to rotate around the second axis center; and
      at least one element configured to swing around the second axis center with the discharge guide,
   wherein the first drive force generated by the first drive source moves the discharge guide between the third position and the fourth position, and also rotates the discharge roller.

2. The image reading device according to claim 1, wherein when the discharge guide is moved by the first drive train, the second drive train transmits the first drive force from the first drive source to the discharge roller and allows the discharge roller to discharge the sheet through the discharge opening.

3. The image reading device according to claim 1 further comprising:
   a conveyance roller configured to convey the sheet toward the discharge roller;
   a second drive source configured to generate a second drive force;
   a third drive train configured to transmit the second drive force from the second drive source to the movable plate to move the movable plate between the first position and the second position; and
   a fourth drive train configured to transmit the second drive force from the second drive source to the conveyance roller to rotate the conveyance roller.

4. The image reading device according to claim 3 further comprising:
   a first electromagnetic clutch provided in the first drive train and switches connection and disconnection of the first drive force from the first drive source to the discharge guide; and
   a second electromagnetic clutch provided in the third drive train and switches connection and disconnection of the second drive force from the second drive source to the movable plate.

5. The image reading device according to claim 1 further comprising:
   a conveyance roller configured to convey the sheet to the discharge roller;

a fifth drive train configured to transmit the first drive force from the first drive source to the movable plate to move the movable plate between the first position and the second position; and a sixth drive train configured to transmit the second drive force from the first drive source to the conveyance roller to rotate the conveyance roller.

6. The image reading device according to claim 5 further comprising:

a third electromagnetic clutch provided in the first drive train and switches connection and disconnection of the first drive force from the first drive source to the discharge guide; and a fourth electromagnetic clutch provided in the fifth drive train and switches connection and disconnection of the first drive force from the first drive source to the movable plate.

7. The image reading device according to claim 1 further comprising:

a discharge unit in which the discharge guide and the discharge roller are installed.

* * * * *

UNITED STATES PATENT AND TRADEMARK OFFICE
CERTIFICATE OF CORRECTION

PATENT NO. : 10,939,005 B2
APPLICATION NO. : 16/351447
DATED : March 2, 2021
INVENTOR(S) : Atsushi Miwa It is certified that error appears in the above-identified patent and that said Letters Patent is hereby corrected as shown below:

In the Claims

Column 26, Line 57, in Claim 4, the phrase "and switches" is deleted and replaced with the phrase "to switch".

Column 26, Line 61, in Claim 4, the phrase "and switches" is deleted and replaced with the phrase "to switch".

Column 27, Line 11, in Claim 6, the phrase "and switches" is deleted and replaced with the phrase "to switch".

Column 27, Line 15, in Claim 6, the phrase "and switches" is deleted and replaced with the phrase "to switch".

Signed and Sealed this
First Day of June, 2021

Drew Hirshfeld
*Performing the Functions and Duties of the*
*Under Secretary of Commerce for Intellectual Property and*
*Director of the United States Patent and Trademark Office*